(12) United States Patent
Matsubara

(10) Patent No.: US 10,596,756 B2
(45) Date of Patent: Mar. 24, 2020

(54) THREE-DIMENSIONAL SHAPING APPARATUS, THREE-DIMENSIONAL SHAPING METHOD, AND INFORMATION PROCESSING DEVICE

(71) Applicant: Kohta Matsubara, Kanagawa (JP)

(72) Inventor: Kohta Matsubara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 590 days.

(21) Appl. No.: 15/183,141

(22) Filed: Jun. 15, 2016

(65) Prior Publication Data

US 2016/0368212 A1 Dec. 22, 2016

(30) Foreign Application Priority Data

Jun. 22, 2015 (JP) ................................. 2015-125091
Feb. 4, 2016 (JP) ................................. 2016-020140

(51) Int. Cl.
| | | |
|---|---|---|
| *B29C 64/165* | (2017.01) | |
| *B33Y 10/00* | (2015.01) | |
| *B33Y 50/02* | (2015.01) | |
| *B29C 64/386* | (2017.01) | |
| *B33Y 30/00* | (2015.01) | |
| *B29K 103/06* | (2006.01) | |

(52) U.S. Cl.
CPC .......... *B29C 64/165* (2017.08); *B29C 64/386* (2017.08); *B33Y 10/00* (2014.12); *B33Y 30/00* (2014.12); *B33Y 50/02* (2014.12); *B29K 2103/06* (2013.01)

(58) Field of Classification Search
CPC ............................ B29C 64/386; B29C 64/165

USPC ........................................................ 264/308
See application file for complete search history.

(56) References Cited

U.S. PATENT DOCUMENTS

| | | | | |
|---|---|---|---|---|
| 6,261,493 | B1 * | 7/2001 | Gaylo | B29C 33/3814 |
| | | | | 264/86 |
| 8,414,280 | B2 * | 4/2013 | Pettis | G06F 3/12 |
| | | | | 425/150 |
| 10,052,822 | B1 * | 8/2018 | Sait | B29C 64/386 |
| 2015/0210007 | A1 * | 7/2015 | Durand | B29C 67/0051 |
| | | | | 264/401 |

(Continued)

FOREIGN PATENT DOCUMENTS

| | | |
|---|---|---|
| JP | 2000-015613 | 1/2000 |
| JP | 2016-155362 A | 9/2016 |

*Primary Examiner* — Robert C Dye
*Assistant Examiner* — Russell E Sparks
(74) *Attorney, Agent, or Firm* — Harness, Dickey & Pierce, P.L.C.

(57) ABSTRACT

A three-dimensional shaping apparatus includes a control unit configured to control a supply unit, a leveling unit, and an ejection unit to repeat a set of processes of supplying powder, forming powder layer, and ejecting shaping liquid to shape a three-dimensional shaped object corresponding to the shaping target. The control unit is configured to stop the set of processes in response to reception of a stop signal, and in response to reception of a resume signal after the reception of the stop signal, control the supply unit, the leveling unit, and the ejection unit to eject the shaping liquid onto at least a part of a dot region on a surface of an outermost powder layer, the dot region being formed by at least one dot formed at the outermost powder layer, and then resume the set of processes.

13 Claims, 12 Drawing Sheets

(56) References Cited

U.S. PATENT DOCUMENTS

2015/0273767 A1* 10/2015 Batchelder .......... G03G 15/224
264/401

* cited by examiner

THREE-DIMENSIONAL SHAPING APPARATUS, THREE-DIMENSIONAL SHAPING METHOD, AND INFORMATION PROCESSING DEVICE

CROSS-REFERENCE TO RELATED APPLICATIONS

The present application claims priority under 35 U.S.C. § 119 to Japanese Patent Application No. 2015-125091 filed on Jun. 22, 2015 and Japanese Patent Application No. 2016-020140 filed on Feb. 4, 2016. The contents of which are incorporated herein by reference in their entirety.

BACKGROUND OF THE INVENTION

1. Field of the Invention

The present invention relates to a three-dimensional shaping apparatus, a three-dimensional shaping method, and an information processing device.

2. Description of the Related Art

Three-dimensional shaping apparatuses using the inkjet printing technology are known. It is known that a set of processes of supplying powder, leveling the surface of the powder to form a powder layer, and ejecting shaping liquid to the powder layer to form dots, for example, is repeated to shape a three-dimensional shaped object. Typical techniques known to the inventor are described in Japanese Patent Application Laid-open No. 2000-015613, for example.

When the apparatus stops operation in the middle of the processes and then starts the operation again, dots formed by the shaping liquid ejected to the powder layer before the stop of operation, in some cases, do not combine with dots formed by the shaping liquid ejected to a newly formed powder layer after the resuming of the operation, which may create discontinuity between the dots. In this case, the resulting three-dimensional shaped object includes a portion, which was formed before the stop and after the resuming of the operation, less strong than the other portions of the three-dimensional shaped object, in some cases. In other words, typical techniques known to the inventor cannot prevent strength loss in the three-dimensional shaped object.

SUMMARY OF THE INVENTION

According to one aspect of the present invention, a three-dimensional shaping apparatus includes: a supply unit, a leveling unit, an ejection unit, a control unit and a reception unit. The supply unit is configured to supply powder. The leveling unit is configured to level a surface of the supplied powder in a first direction to form a powder layer. The ejection unit is configured to eject shaping liquid to at least one position on a surface of the powder layer, the at least one position corresponding to a shaping target, to form at least one dot. The control unit is configured to control the supply unit, the leveling unit, and the ejection unit to repeat a set of processes of supplying the powder, forming the powder layer, and ejecting the shaping liquid to shape a three-dimensional shaped object corresponding to the shaping target. The reception unit is configured to receive a stop signal indicating a stop of operation and a resume signal indicating resuming of the operation. The control unit is configured to stop the set of processes in response to reception of the stop signal, and in response to reception of the resume signal after the reception of the stop signal, control the supply unit, the leveling unit, and the ejection unit to eject the shaping liquid onto at least a part of a dot region on a surface of an outermost powder layer, the dot region being formed by at least one dot formed at the outermost powder layer, and then resume the set of processes.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENT

Figure 1:
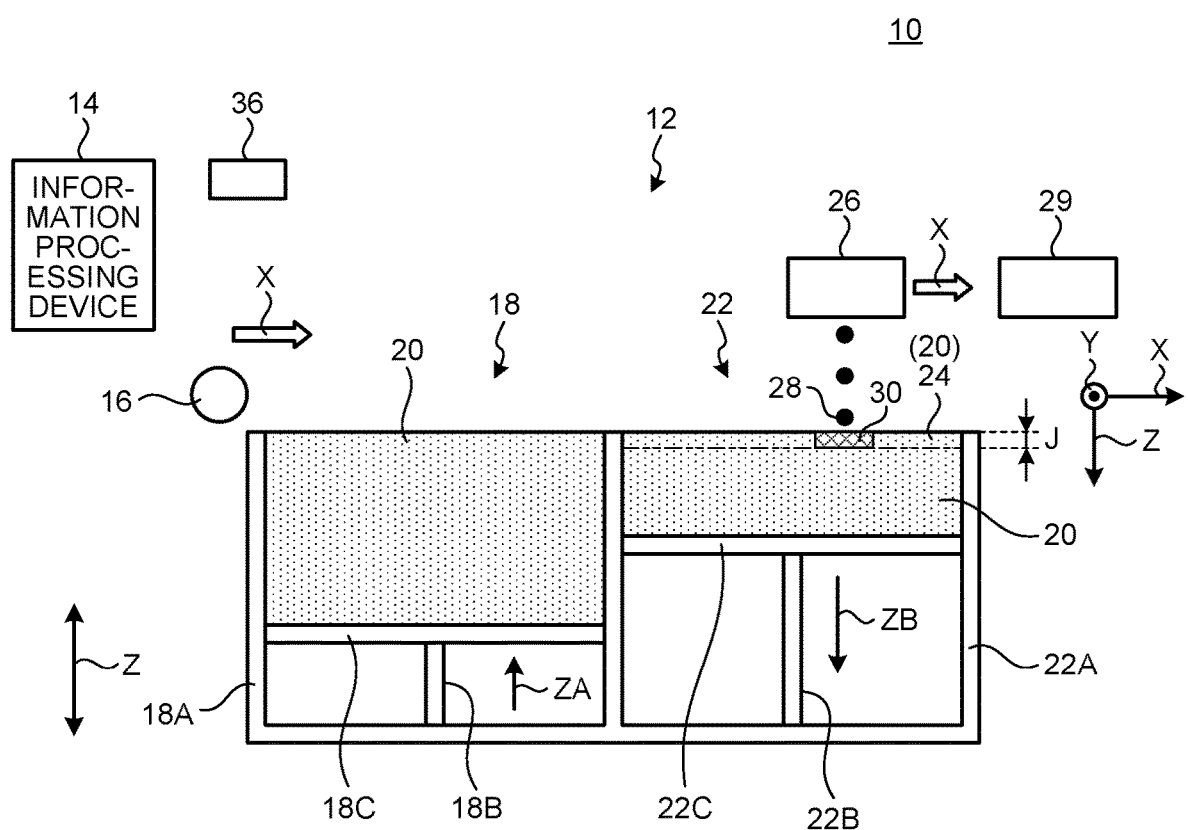
FIG. 1 is a schematic view illustrating an example of a three-dimensional shaping apparatus.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes an embodiment of a three-dimensional shaping apparatus, a three-dimensional shaping method, and an information processing apparatus in detail with reference to the accompanying drawings.

An object of an embodiment is to reduce strength loss in a three-dimensional shaped object.

FIG. 1 is a schematic view illustrating an example of a three-dimensional shaping apparatus 10.

The apparatus 10 includes a shaping device 12, an information processing device 14, and a user interface (UI) unit 36. The shaping device 12 and the UI unit 36 are connected with the information processing device 14 to be able to send and receive data and signals to and from each other.

The UI unit 36 receives various operation instructions from the user and displays various types of information. The UI unit 36 is, for example, a display with a keyboard or a touch screen. The UI unit 36 may be separated into an operating unit that receives operation instructions from the user and a display unit that displays various types of information.

The information processing device 14 controls the shaping device 12. The shaping device 12 shapes a three dimensional shaped object under the control of the information processing device 14. The shaping device 12 includes a supply unit 18, a leveling unit 16, an ejection unit 26, a shaping unit 22, and a maintenance unit 29.

The supply unit 18 stores therein powder 20 to be supplied to the shaping unit 22. In the present embodiment, the supply unit 18 and the shaping unit 22 are disposed in series in a first direction (see the arrow X in FIG. 1), which may be hereinafter referred to as a first direction X. In the present embodiment, the first direction X is described as one direction in the horizontal plane. In the present embodiment, the supply unit 18 and the shaping unit 22 are disposed in series in the first direction X with the supply unit 18 being disposed upstream and the shaping unit 22 being disposed downstream in the first direction X.

The supply unit 18 includes a supply chamber 18A, a stage 18C, and a support 18B. The supply chamber 18A stores therein the powder 20. The supply chamber 18A opens vertically upwards (in the direction of the arrow ZA in FIG. 1). In the present embodiment, the supply chamber 18A has an opening having the same shape and the same opening area as an opening of a shaping chamber 22A (to be described later) of the shaping unit 22, and is disposed in series in the first direction X with respect to the shaping unit 22.

When the amount of the powder 20 stored in the supply chamber 18A is reduced to a predetermined amount or less, a separately disposed powder supply mechanism supplies the powder 20 to the supply chamber 18A to recover the reduced amount.

The stage 18C constitutes the inner bottom of the supply chamber 18A. The stage 18C is supported by the support 18B. The support 18B movably supports the stage 18C in a direction perpendicular to the horizontal direction (see the double arrow Z in FIG. 1).

In the present embodiment, the support 18B moves the stage 18C vertically upwards (see the arrow ZA in FIG. 1) by a predetermined amount at a time under the control of the information processing device 14. This operation pushes up a part of the powder 20 stored in the supply chamber 18A above the opening of the supply chamber 18A. When the powder supply mechanism supplies the powder to the supply chamber 18A, the support 18B moves the stage 18C vertically downwards (in the direction of the arrow ZB in FIG. 1) under the control of the information processing device 14.

In the shaping unit 22, a three-dimensional shaped object is shaped. The shaping unit 22 includes the shaping chamber 22A, a support 22B, and a stage 22C.

The shaping chamber 22A stores therein the powder 20 supplied from the supply unit 18. To the powder 20 stored in the shaping chamber 22A, shaping liquid 28 is ejected, and a three-dimensional shaped object is shaped inside the shaping chamber 22A. The shaping chamber 22A opens vertically upwards (in the direction of the arrow ZA in FIG. 1). The opening of the shaping chamber 22A is disposed in series in the first direction X with respect to the opening of the supply chamber 18A.

The stage 22C constitutes the inner bottom of the shaping chamber 22A. The stage 22C is supported by the support 22B. The support 22B movably supports the stage 22C in a direction perpendicular to the horizontal direction (see the double arrow Z in FIG. 1).

In the present embodiment, the support 22B moves the stage 22C vertically downwards (see the arrow ZB in FIG. 1) by a predetermined amount at a time under the control of the information processing device 14. This operation creates a space at the opening of the shaping chamber 22A for receiving newly supplied powder 20 from the supply unit 18.

The leveling unit 16 is a long member extending, at the opening of the supply chamber 18A, in a direction (Y direction in FIG. 1) perpendicular to the first direction X in which the supply unit 18 and the shaping unit 22 are disposed in series. The leveling unit 16 has, for example, a shape of a circular cylinder or a plate.

The leveling unit 16 is supported to be able to reciprocate upstream and downstream in the first direction X. The leveling unit 16 reciprocates upstream and downstream in the first direction X under the control of the information processing device 14.

The leveling unit 16 is initially disposed upstream of the supply unit 18 in the first direction, and moves downstream along the first direction X under the control of the information processing device 14. By this operation, the powder 20 pushed up above the opening of the supply chamber 18A is sent toward the shaping unit 22 and is supplied to the shaping unit 22.

The leveling unit 16 moves further downstream in the first direction X under the control of the information processing device 14. In this operation, the leveling unit 16 levels the surface of the powder 20 supplied to the shaping unit 22 in the first direction X, thereby forming a powder layer 24 having a thickness J in the shaping chamber 22A.

After the leveling unit 16 moves from a position upstream of the supply unit 18 to a position downstream of the shaping unit 22 in the first direction X and forms the powder layer 24, the leveling unit 16 moves back in the first direction X to the upstream position at which the leveling unit 16 is initially disposed.

In the context of the present embodiment, the supply unit 18 stores therein the powder 20 to be supplied to the shaping unit 22, and the leveling unit 16 moves in the first direction X to supply the powder 20 stored in the supply unit 18 to the shaping unit 22 to form the powder layer 24. In the present embodiment, however, the supply unit 18 may directly supply the powder 20 to the shaping unit 22, and the leveling unit 16 may level the surface of the powder 20 supplied to the shaping unit 22 to form the powder layer 24.

The ejection unit 26 ejects the shaping liquid 28 to a position on the surface of the powder layer 24 corresponding to a shaping target, and forms a dot 30.

The ejection unit 26 includes a mechanism of a known inkjet printing technique. The ejection unit 26 is supported to be able to move in the first direction X, the direction perpendicular to the horizontal direction (the direction of the arrow Z in FIG. 1), and the direction perpendicular to the first direction and the direction of the arrow Z (the direction of the arrow Y in FIG. 1).

The ejection unit 26 ejects the shaping liquid 28 to positions on the surface of the powder layer 24 corresponding to a shaping target to form dots 30 under the control of the control unit 14B. Specifically, the ejection unit 26 ejects droplets of the shaping liquid 28 from a plurality of nozzles to form the dots 30.

The maintenance unit 29 is a mechanism for preserving and recovering the condition or the state of the ejection unit 26. The maintenance unit 29 includes a mechanism for correcting ejection defects of the ejection unit 26 in ejecting the shaping liquid 28. The maintenance unit 29 can be any known maintenance mechanism typically used for inkjet heads. For example, the maintenance unit 29 may include a suction mechanism for drawing the shaping liquid 28 from the nozzles of the ejection unit 26 or a wiping mechanism for wiping the nozzle surface of the ejection unit 26.

The information processing device 14 controls the supply unit 18, the leveling unit 16, and the ejection unit 26 to repeat a set of processes of supplying the powder 20, forming the powder layer 24, and ejecting the shaping liquid 28 in this order to shape a three-dimensional shaped object corresponding to a shaping target.

The powder 20 is made of a base material in a particulate form with the surface covered with a coating layer (details will be described later). The shaping liquid 28 has a function of dissolving the coating layer and then solidifying the coating layer (details will be described later).

By this function, at least a part of the coating layer of the powder 20 is dissolved and then combined with each other in a region on the powder layer 24 to which the shaping liquid 28 is ejected to form dots 30. The dots 30 are then layered by the repetition of the processes of forming the powder layer 24 and ejecting the shaping liquid 28. With this operation, dot regions formed by the dots 30 in powder layers 24 are successively solidified, thereby forming a three-dimensional shaped object.

Figure 2:
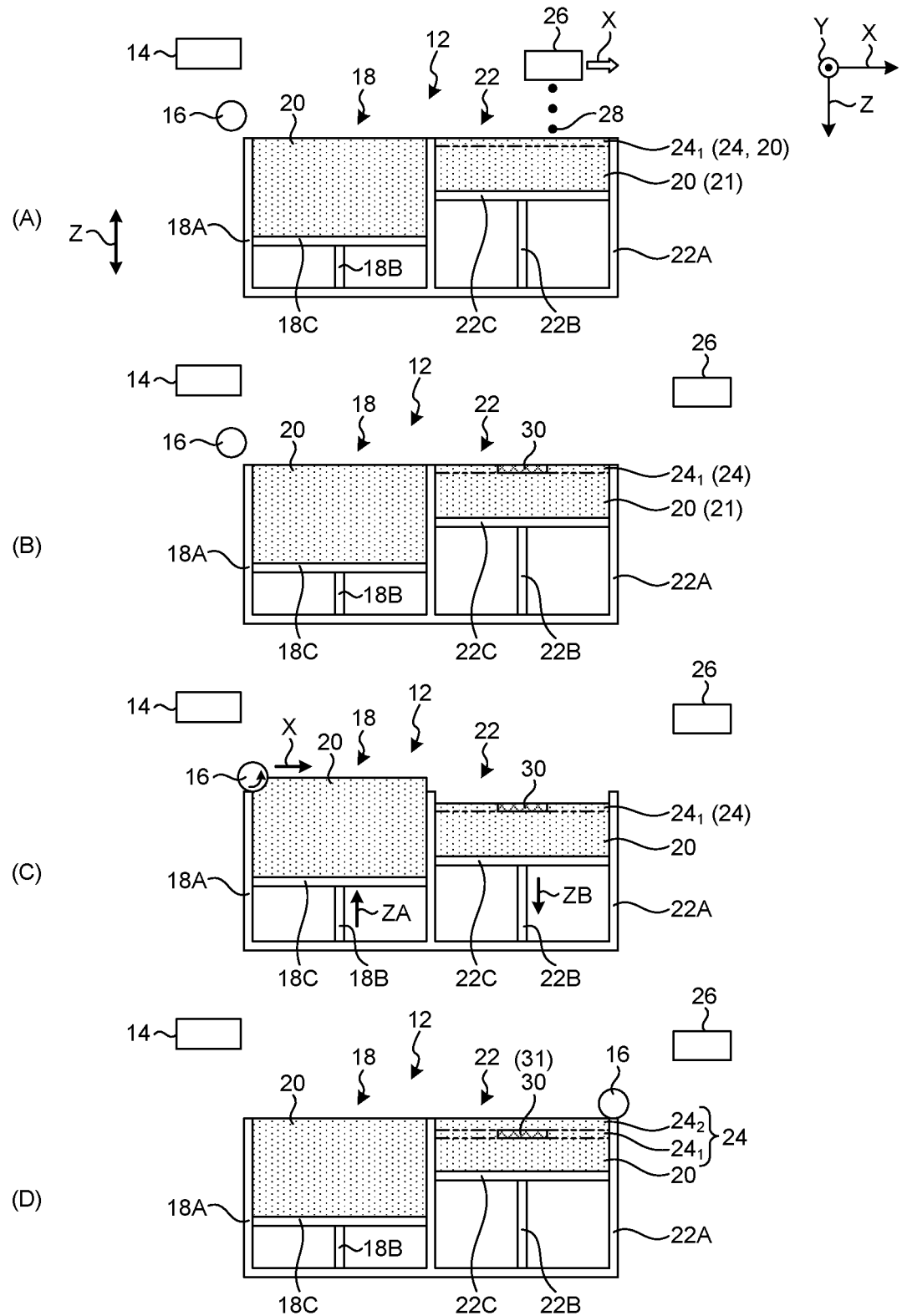
FIG. 2 is a schematic view illustrating an example of the procedure of a set of processes.

FIG. 2 is a schematic view illustrating an example of the procedure of the set of processes of supplying the powder 20, forming the powder layer 24, and ejecting the shaping liquid 28. The set of processes described below are performed under the control of the information processing device 14.

The supply unit 18 and the leveling unit 16 supply the powder 20 to the shaping unit 22, and the leveling unit 16 levels the surface of the powder 20 in the first direction X, thereby forming, for example, a first powder layer 24 (powder layer $24_1$) (see (A) in FIG. 2).

The ejection unit 26 then ejects the shaping liquid 28 to a position on the surface of the powder layer $24_1$ corresponding to a shaping target (see (A) in FIG. 2). By this process, dots 30 are formed at the powder layer $24_1$ with the shaping liquid 28 (see (B) in FIG. 2).

Subsequently, the support 22B moves the stage 22C vertically downwards (in the direction of the arrow ZB) by a predetermined amount under the control of the information processing device 14 (see (C) in FIG. 2). This operation creates a space at the opening of the shaping chamber 22A for receiving newly supplied powder 20 from the supply unit 18. The predetermined amount may be equal to or larger than the thickness J of the powder layer 24 to be formed with the newly supplied powder 20.

The thickness J of the powder layer 24 may be determined such that, for example, one droplet of the shaping liquid 28 ejected from the ejection unit 26 permeates into the powder layer 24 in the thickness direction from one surface to the other surface thereof. The thickness J varies depending on the kind of the powder 20 or the shaping liquid 28, or the ejection properties of the ejection unit 26. The thickness J is, for example, tens of μm to 100 μm.

Subsequently, the support 18B moves the stage 18C vertically upwards (in the direction of the arrow ZA) by a predetermined amount under the control of the information processing device 14. The predetermined amount is such an amount that the powder 20 is pushed up at the opening of the supply chamber 18A in an amount sufficient to form a powder layer 24 having the thickness J in the shaping unit 22. This operation pushes up a part of the powder 20 stored in the supply chamber 18A above the opening of the supply chamber 18A (see (C) in FIG. 2).

The leveling unit 16 initially disposed upstream of the supply unit 18 in the first direction X moves downstream along the first direction X under the control of the information processing device 14. By this operation, the powder 20 pushed up above the opening of the supply chamber 18A is sent toward the shaping unit 22 and is supplied to the shaping unit 22 (see (C) and (D) in FIG. 2).

The leveling unit 16 moves further downstream in the first direction X. The leveling unit 16 levels the surface of the powder 20 supplied to the shaping unit 22 in the first direction X, thereby forming a powder layer $24_2$ having the thickness J (see (D) in FIG. 2). This powder layer $24_2$ formed in the current set of processes is layered over the powder layer $24_1$ including the dots 30, which were formed in the previous set of processes.

The information processing device 14 controls the shaping device 12 to repeat the set of processes illustrated in FIG. 2. The information processing device 14 determines the intervals of the set of processes such that a new set of processes, in which a new powder layer 24 is formed and the shaping liquid 28 is ejected to the new powder layer 24, starts before the surface of the dots 30 that were formed at the powder layer 24 in the previous set of processes, dries (the set of processes illustrated in (C), (D), (A), and (B) in FIG. 2).

The information processing device 14 controls the shaping device 12 to repeat the set of processes described above, whereby powder layers 24 including dots 30 are layered in the shaping unit 22 and regions of the dots 30 in the powder layers 24 are joined to form a three-dimensional shaped object 31.

Figure 3:
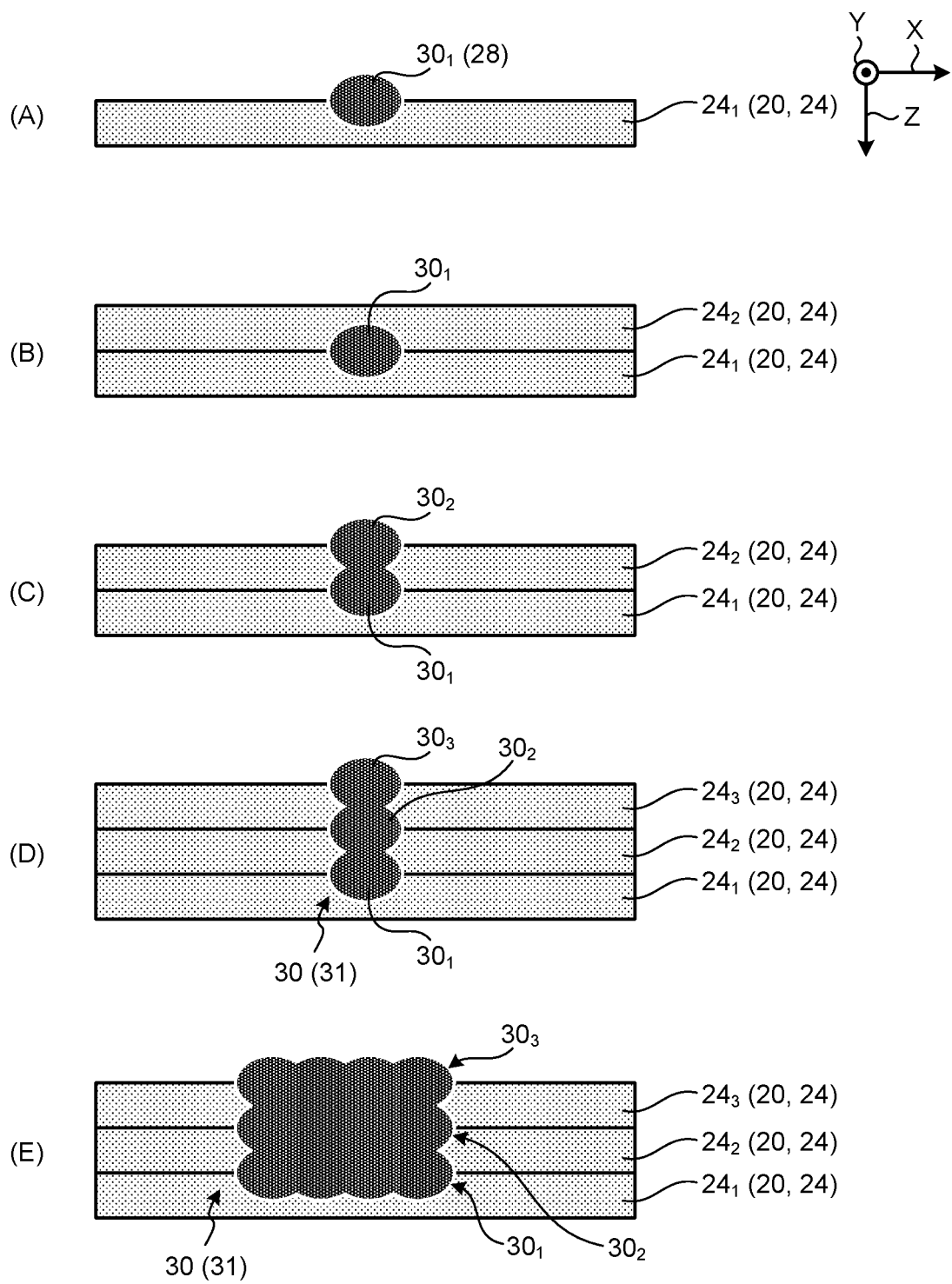
FIG. 3 is a schematic view illustrating an example of the procedure for shaping a three dimensional shaped object.

The procedure for shaping a three-dimensional shaped object will be described more specifically. FIG. 3 is a schematic view illustrating an example of the procedure for shaping a three-dimensional shaped object.

When the shaping liquid 28 is ejected to a powder layer $24_1$ formed by the leveling unit 16, a dot $30_1$ (dot 30) is formed at the powder layer $24_1$ (see (A) in FIG. 3). A powder layer $24_2$ is then formed on the powder layer $24_1$ at which the dot $30_1$ is formed (see (B) in FIG. 3), and the shaping liquid 28 is ejected to the powder layer $24_2$ to form a dot $30_2$ (see (C) in FIG. 3).

A powder layer $24_3$ is formed on the powder layer $24_2$ at which the dot $30_2$ is formed, and the shaping liquid 28 is ejected to the powder layer $24_3$ to form a dot $30_3$ (see (D) in FIG. 3).

The dots 30 (dot $30_1$ to $30_3$) formed by the shaping liquid 28 ejected to the powder layers 24 (powder layers $24_1$ to $24_3$) contain the powder 20, in which at least a part of the coating layer of the powder 20 is dissolved and is combined with each other. A new powder layer 24 is formed on the previous powder layer 24 and a new dot 30 is formed at the new powder layer 24 before the surface of the dot 30 formed at the previous powder layer 24 becomes dry. With this configuration, dot regions formed by the dots 30 in the powder layers 24 are successively solidified. The successively solidified regions (regions of the dots 30₁ to 30₃ in FIG. 3) become the three-dimensional shaped object 31.

At (A) to (D) in FIG. 3, for example, dots 30 are formed one by one in the thickness direction of the powder layers 24. However, a plurality of dots 30 may be formed in the horizontal direction (on a plane defined by the first direction X and the Y direction) of the powder layer 24 depending on the shaping target (see (E) in FIG. 3).

The information processing device 14, in some cases, receives a stop signal that indicates a stop of operation while the set of processes of supplying the powder 20, forming the powder layer 24, and ejecting the shaping liquid 28 is repeated.

Operation is stopped for various reasons. Operation is stopped when, for example, the maintenance unit 29 performs maintenance on the ejection unit 26 or the user instructs emergency shutdown via the UI unit 36.

The information processing device 14 stops the set of processes on receiving a stop signal. When the cause of the stop of operation indicated by the stop signal is eliminated, the information processing device 14 resumes the set of processes.

In this situation, in some cases, a dot 30 formed by the shaping liquid 28 ejected to a powder layer 24 before the stop of the set of processes does not combine with a dot 30 formed by the shaping liquid 28 ejected to a newly formed powder layer 24 after the resuming of the set of processes, which may create discontinuity between the dots 30.

Figure 4:
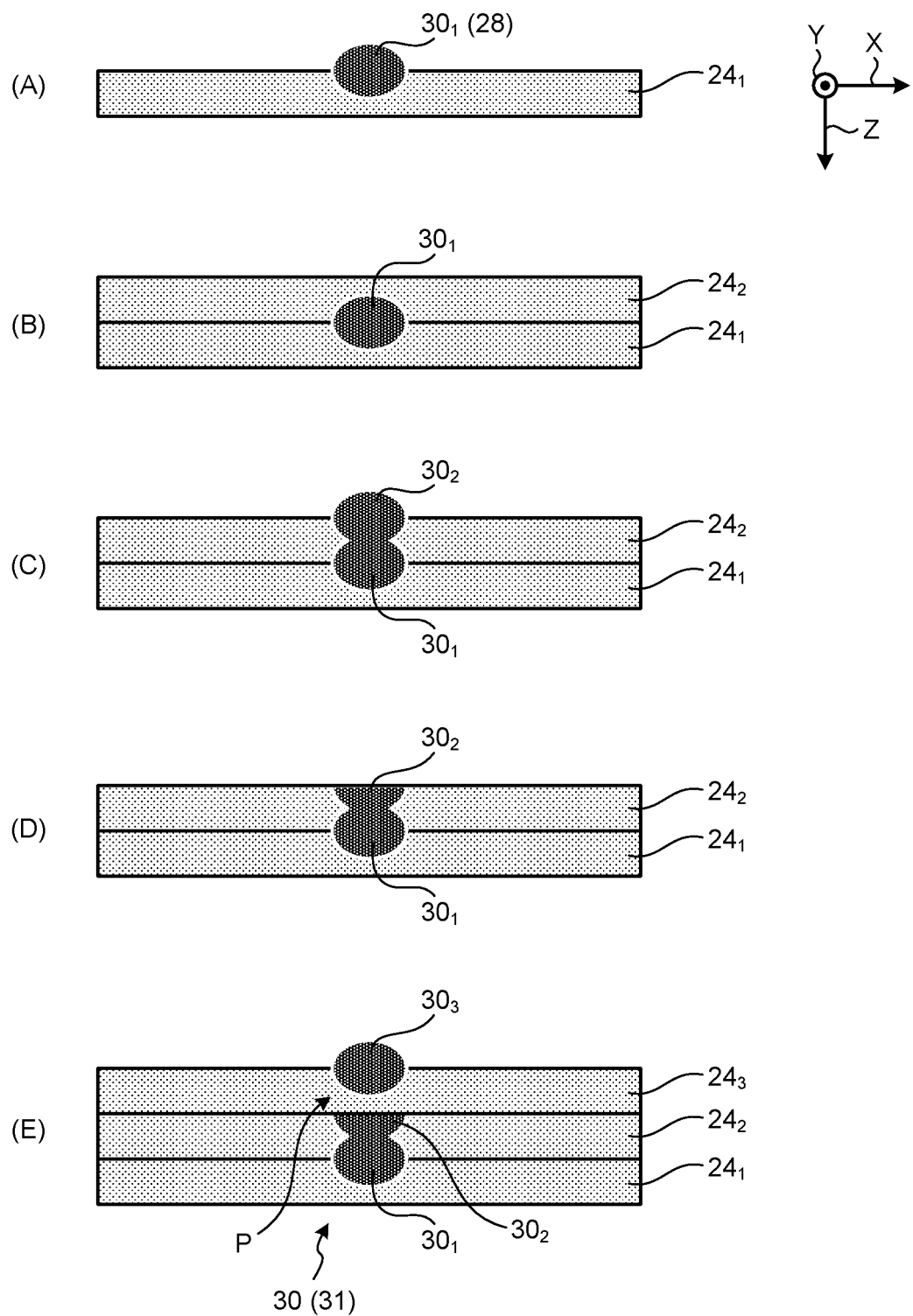
FIG. 4 is a schematic view illustrating an example of a phenomenon where discontinuity is created between dots in powder layers.

FIG. 4 is a schematic view illustrating an example of a phenomenon where discontinuity is created between dots 30 in powder layers 24.

When, for example, the shaping liquid 28 is ejected to a powder layer 24₁ formed by the leveling unit 16, a dot 30₁ (dot 30) is formed at the powder layer 24₁ (see (A) in FIG. 4). A powder layer 24₂ is then formed on the powder layer 24₁ (see (B) in FIG. 4), and the shaping liquid 28 is ejected to the powder layer 24₂ to form a dot 30₂ (see (C) in FIG. 4).

Suppose that the information processing device 14 controls the shaping device 12 to stop the set of processes at this point. Then, the surface of the dot 30₂ formed at the powder layer 24₂ before the stop of the operation permeates into the powder layer 24₂ or becomes dry in some cases to the extent that discontinuity is created between the dot 30₂ and a dot 30₃ at a powder layer 24₃ to be formed after the resuming of the operation (see (D) in FIG. 4).

In this state, suppose that the information processing device 14 controls the shaping device 12 to resume the set of processes and to form the powder layer 24₃ on the powder layer 24₂ and the dot 30₃ at the powder layer 24₃. The dot 30₂ formed at the powder layer 24₂ before the stop of the operation does not combine with the dot 30₃ formed at the powder layer 24₃ after the resuming of the operation in some cases and a gap P is formed between dots 30 (between the dot 30₂ and the dot 30₃), which may result in discontinuity between dots 30 (see (E) in FIG. 4).

In some cases, as described above, a dot 30 formed by the shaping liquid 28 ejected onto a powder layer 24 before the stop of the set of processes does not combine with a dot 30 formed by the shaping liquid 28 ejected onto a newly formed powder layer 24 after the resuming of the set of processes, which may create discontinuity between the dots 30. Thus, in the typical technique known to the inventor, strength loss occurs in the resulting three-dimensional shaped object 31 when the operation is stopped in the middle of the set of processes for shaping the three-dimensional shaped object 31.

In the three-dimensional shaping apparatus 10 according to the present embodiment, the information processing device 14 performs a particular control.

Figure 5:
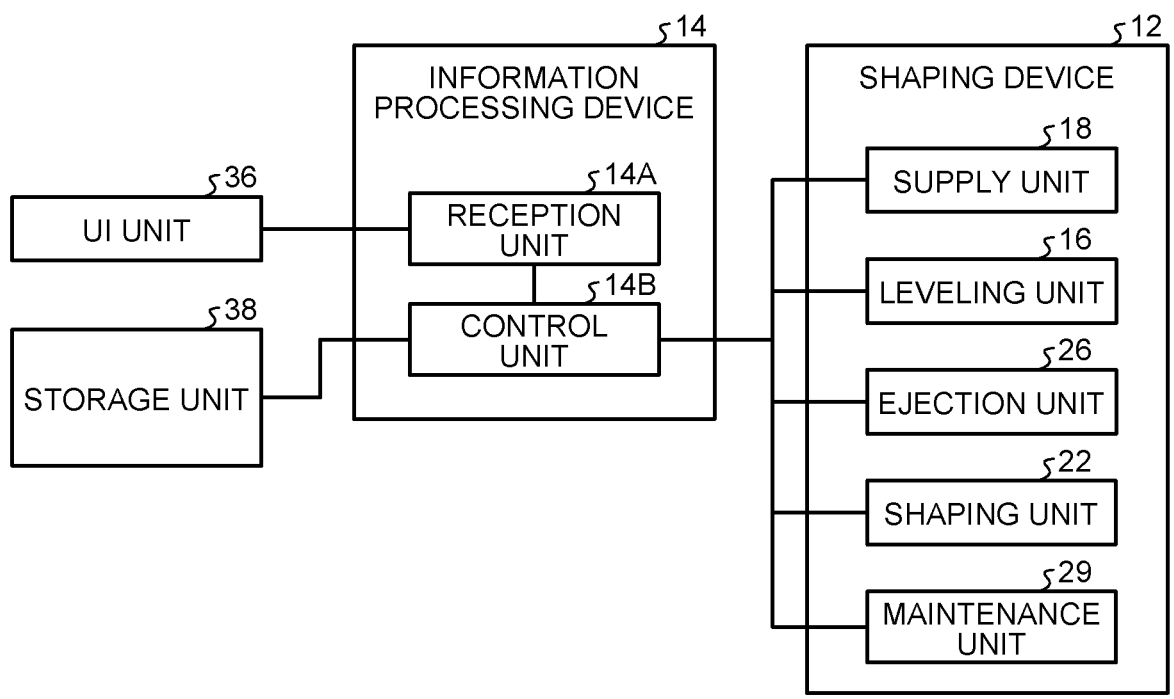
FIG. 5 is a functional block diagram of the three-dimensional shaping apparatus.

FIG. 5 is a functional block diagram of the three-dimensional shaping apparatus 10 according to the present embodiment. The three-dimensional shaping apparatus 10 includes the UI unit 36, a storage unit 38, the information processing device 14, and the shaping device 12. The UI unit 36, the storage unit 38, and the shaping device 12 are connected with the information processing device 14 to be able to send and receive data and signals to and from each other. The storage unit 38 stores therein various kinds of data.

The information processing device 14 is a computer configured by, for example, a central processing unit (CPU), and controls the entire three-dimensional shaping apparatus 10. The information processing device 14 may be configured by other devices than a general-purpose CPU. The information processing device 14 may be configured by, for example, a circuit.

The information processing device 14 includes a reception unit 14A and the control unit 14B. A part or all of the reception unit 14A and the control unit 14B may be implemented by, for example, causing a processing device such as the CPU to execute a computer program, that is, implemented by software or may be implemented by hardware such as an integrated circuit (IC), or may be implemented by both software and hardware.

The reception unit 14A receives a stop signal indicating a stop of operation and a resume signal indicating resuming of the operation.

For example, the information processing device 14 controls the ejection unit 26 and the maintenance unit 29 such that the maintenance unit 29 performs maintenance on the ejection unit 26 at certain intervals. The certain intervals may be determined as appropriate depending on the mechanism of the ejection unit 26, the type of the shaping liquid 28, and the installation environment of the three-dimensional shaping apparatus 10. The certain intervals may be changeable by an instruction from the user through the UI unit 36.

When the maintenance unit 29 starts performing maintenance on the ejection unit 26 under the control of the information processing device 14, the maintenance unit 29 may transmit a stop signal indicating a stop of operation to the information processing device 14. In this case, the reception unit 14A receives the stop signal from the maintenance unit 29.

The maintenance unit 29 transmits a resume signal indicating resuming of the operation to the information processing device 14 when the maintenance of the ejection unit 26 is completed. In this case, the reception unit 14A receives the resume signal from the maintenance unit 29.

The reception unit 14A may receive the stop signal from the UI unit 36. The user operates, for example, predetermined buttons on the UI unit 36 for instructing a stop of the set of processes. Upon receiving the operation from the user, the UI unit 36 transits a stop signal to the information processing device 14. In this case, the reception unit 14A of the information processing device 14 receives the stop signal form the UI unit 36.

The reception unit 14A receives a resume signal indicating resuming of the operation from the UI unit 36. The user operates, for example, predetermined buttons on the UI unit 36 for instructing resuming of the operation. Upon receiving the operation from the user, the UI unit 36 transmits a resume signal to the information processing device 14. In this case, the reception unit 14A of the information processing device 14 receives the resume signal form the UI unit 36.

In the context of the present embodiment, the reception unit 14A receives the stop signal and the resume signal from the maintenance unit 29 or the UI unit 36.

The control unit 14B controls the supply unit 18, the leveling unit 16, and the ejection unit 26 to repeat the set of processes of supplying the powder 20, forming the powder layer 24, and ejecting the shaping liquid 28. Under the control of the control unit 14B, the three-dimensional shaped object 31 corresponding to a shaping target is shaped.

Specifically, the control unit 14B generates print data with which the shaping device 12 can shape the three-dimensional shaped object 31, from image data representing the shaping target. The print data may be generated by a known method. The control unit 14B may acquire the image data from an external device via a communication line, or from the storage unit 38. The control unit 14B may generate the print data based on the acquired image data.

The control unit 14B controls the shaping device 12 to repeat the set of processes in accordance with the print data to shape the three-dimensional shaped object 31 corresponding to the shaping target.

In the present embodiment, the control unit 14B stops the set of processes when the reception unit 14A receives a stop signal. When the reception unit 14A receives a resume signal after receiving the stop signal, the control unit 14B controls the supply unit 18, the leveling unit 16, and the ejection unit 26 to eject the shaping liquid 28 onto at least a part of a dot region on the surface of the outermost powder layer 24, the dot region being formed by dots 30 formed at the outermost powder layer 24, and then resume the set of processes.

Figure 6:
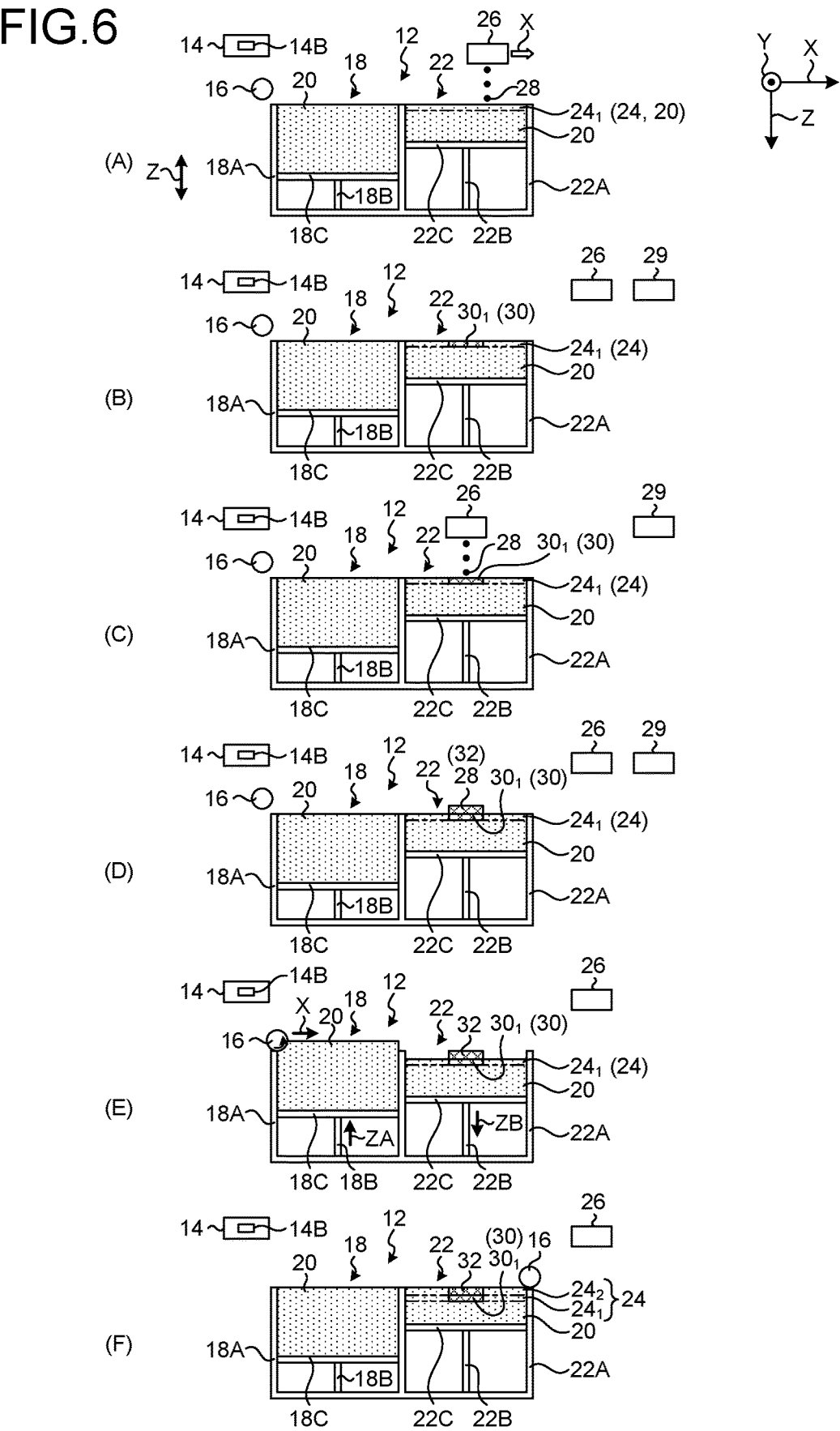
FIG. 6 is a schematic view illustrating an example of the procedure for shaping a three dimensional shaped object.

FIG. 6 is a schematic view illustrating an example of the procedure for shaping a three-dimensional shaped object performed in the three-dimensional shaping apparatus 10 according to the present embodiment after the set of processes is stopped and then resumed.

Suppose that the supply unit 18 and the leveling unit 16 supply the powder 20 to the shaping unit 22, and the leveling unit 16 levels the surface of the powder 20 in the first direction X to form, for example, a first powder layer 24 (powder layer $24_1$) (see (A) in FIG. 6).

The ejection unit 26 then ejects the shaping liquid 28 to a position on the surface of the powder layer $24_1$ corresponding to a shaping target (see (A) in FIG. 6). Dots $30_1$ formed by the shaping liquid 28 are formed at the powder layer $24_1$ (see (B) in FIG. 6).

Suppose that the reception unit 14A receives a stop signal.

The control unit 14B stops the set of processes. The shaping process in the shaping unit 22 is temporarily stopped with the powder layer $24_1$ formed with the dots $30_1$ (see (B) in FIG. 6).

The reception unit 14A receives a resume signal. The control unit 14B then controls the ejection unit 26 to eject the shaping liquid 28 onto at least a part of a dot region on the surface of the outermost powder layer $24_1$, the dot region being formed by the dots $30_1$ formed at the powder layer $24_1$ (see (C) in FIG. 6).

In other words, upon reception of the resume signal after the stop of the set of processes, the control unit 14B causes the ejection unit 26 to eject the shaping liquid 28 onto at least a part of the dot region on the surface of the existing outermost powder layer $24_1$, the dot region being formed by the dots $30_1$ formed at the powder layer $24_1$, before the next powder layer $24_2$ is formed. By this process, dots 32 formed by the newly ejected shaping liquid 28 are formed on the dots $30_1$ (see (D) in FIG. 6).

The dots 32, which are not included in the print data of the shaping target, are formed in contact with the dots $30_1$, which are formed in accordance with the print data of the shaping target, at the surface of the outermost powder layer $24_1$ that was formed before the stop of the set of processes (see (D) in FIG. 6).

Subsequently, the control unit 14B controls the supply unit 18, the leveling unit 16, and the ejection unit 26 to resume the set of processes after the dots 32 are formed by the ejection of the shaping liquid 28.

In other words, the support 22B moves the stage 22C vertically downwards (in the direction of the arrow ZB) by a predetermined amount (an amount corresponding to the thickness J, for example) under the control of the control unit 14B (see (E) in FIG. 6). This process creates a space at the opening of the shaping chamber 22A for receiving newly supplied powder 20 from the supply unit 18. The support 18B moves the stage 18C vertically upwards (in the direction of the arrow ZA) by a predetermined amount (an amount corresponding to the thickness J, for example) under the control of the control unit 14B. This process pushes up a part of the powder 20 stored in the supply chamber 18A above the opening of the supply chamber 18A (see (E) in FIG. 6).

The leveling unit 16 initially disposed upstream of the supply unit 18 in the first direction X moves downstream along the first direction X under the control of the control unit 14B. The powder 20 above the opening of the supply chamber 18A is supplied to the shaping unit 22 (see (E) and (F) in FIG. 6).

The leveling unit 16 moves further downstream in the first direction X. In this operation, the leveling unit 16 levels the surface of the powder 20 supplied to the shaping unit 22 in the first direction X, thereby forming a powder layer $24_2$ having the thickness J (see (F) in FIG. 6).

Then, the shaping liquid 28 is ejected onto the powder layer $24_2$ in the same manner as illustrated at (A) in FIG. 6, and the set of processes is repeated.

Figure 7:
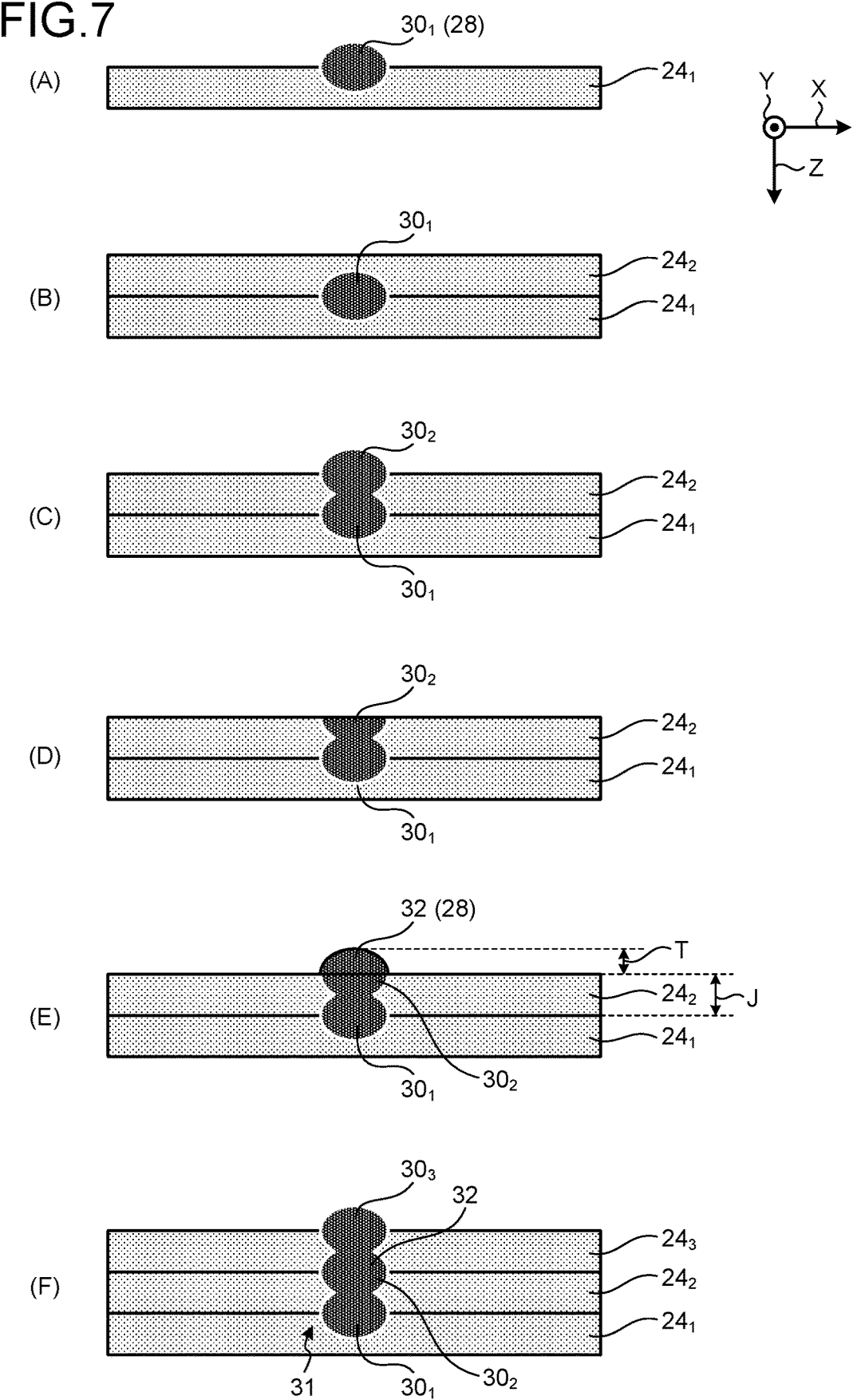
FIG. 7 is a view illustrating a state of dots.

FIG. 7 is a view illustrating the state of the dots 30 and the dot 32 in the three-dimensional shaping apparatus 10 according to the present embodiment when the set of processes is resumed after the stop thereof.

When the shaping liquid 28 is ejected to a powder layer $24_1$, a dot $30_1$ (dot 30) is formed at the powder layer $24_1$ (see (A) in FIG. 7). A powder layer $24_2$ is then formed on the powder layer $24_1$ (see (B) in FIG. 7) and the shaping liquid 28 is ejected to the powder layer $24_2$ to form a dot $30_2$ (see (C) in FIG. 7).

Suppose that the control unit 14B performs control to stop the set of processes at this point. Then, in some cases, the dot $30_2$ formed at the powder layer $24_2$ permeates into the powder layer $24_2$ or becomes dry during the stop to the extent that discontinuity is created between the dot $30_2$ and a dot $30_3$ formed by the shaping liquid 28 to be ejected onto a newly formed powder layer $24_3$ (see (D) in FIG. 7).

In the present embodiment, as described above, the control unit 14B causes the shaping liquid 28 to be ejected onto the dot $30_2$ on the powder layer $24_2$ at the resuming of the operation to form a dot 32 (see (E) in FIG. 7).

Any amount of the shaping liquid 28 may be ejected to form the dot 32 as long as a droplet (dot 32) of the shaping liquid 28 having a thickness T larger than zero and equal to or smaller than the thickness J of the powder layer 24 is made to present on the surface of the powder layer $24_2$ (the outermost powder layer 24 before the stop of the operation) at the time of the resuming of the operation.

It is preferable that the amount of the shaping liquid 28 to be ejected to form the dot 32 is determined such that the a droplet (dot 32) of the shaping liquid 28 having the thickness T exists on the surface of the powder layer $24_2$ (the outermost powder layer 24 at the time of the stop of the operation) when a new powder layer $24_3$ is formed and the shaping liquid 28 is ejected thereto in the set of processes immediately after the resuming of the operation.

The control unit 14B performs control to resume the set of processes. Then, the new powder layer $24_3$ and a dot $30_3$ are formed on the dot 32 (see (F) in FIG. 7).

With this configuration, the dot 30 (dot $30_2$ at (F) in FIG. 7) formed by the shaping liquid 28 ejected onto the powder layer 24 before the stop of the set of processes combines with a dot 30 (dot $30_3$ at (F) in FIG. 7) formed by the shaping liquid 28 ejected onto a powder layer 24 that is newly formed after the resuming of the set of processes via the dot 32 formed by the shaping liquid 28 ejected after the stop and before the resuming of the set of processes, thereby forming contiguous dots.

Thus, the shaping device 12 according to the present embodiment can prevent strength loss in the resulting three-dimensional shaped object 31 even if the set of processes is stopped in the middle of the shaping.

Upon reception of a resume signal after the reception of a stop signal, the shaping liquid 28 may be ejected to at least a part of the dot region on the surface of the existing outermost powder layer 24, the dot region being formed by the dots 30 formed at the powder layer 24.

Figure 8:
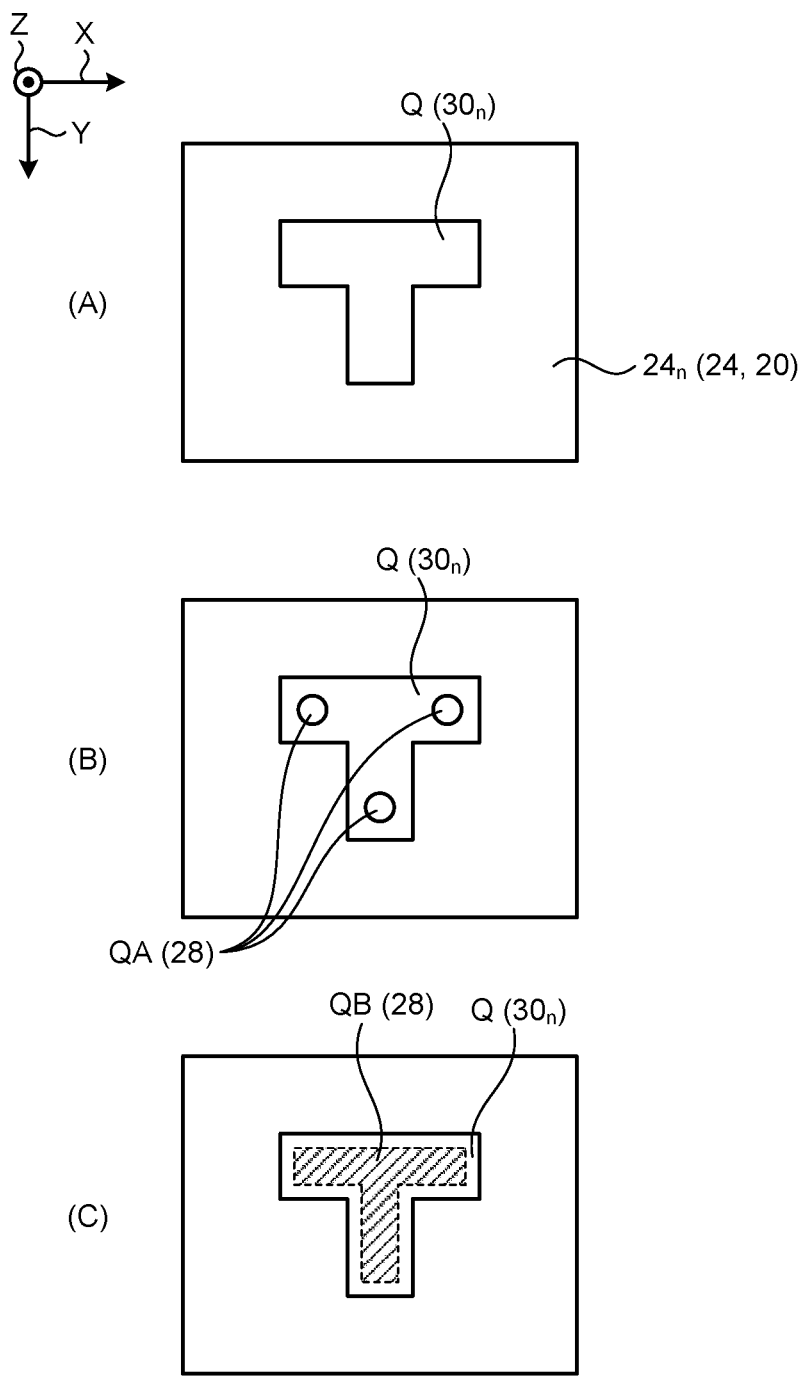
FIG. 8 is a view illustrating regions to which shaping liquid is ejected.

FIG. 8 is a view illustrating regions to which the shaping liquid 28 is ejected upon reception of a resume signal after the reception of a stop signal.

Suppose that, for example, an existing outermost powder layer $24_n$ is already formed with a dot region Q formed by the dots $30_n$ when the control unit 14B receives a stop signal (see (A) in FIG. 8).

In this case, for example, upon reception of the resume signal after the stop of the set of processes, the control unit 14B may cause the shaping liquid 28 to be ejected onto regions QA that are a part of the dot region Q on the surface of the outermost powder layer $24_n$ the dot region Q being formed by the dots $30_n$ formed at the powder layer $24_n$ (see (B) in FIG. 8).

It is preferable that upon reception of the resume signal after the stop of the set of processes, the control unit 14B causes the shaping liquid 28 to be ejected onto a region QB inside the outline of the dot region Q on the surface of the outermost powder layer $24_n$, the dot region Q being formed by the dots $30_n$ formed at the powder layer $24_n$ (see (C) in FIG. 8).

Suppose that, for example, the dot region Q on the surface of the outermost powder layer $24_n$ is formed by a plurality of dots $30_n$ disposed in the horizontal plane (XY plane), the dot region Q being formed by the plurality of dots $30_n$ formed at the powder layer $24_n$. In this case, it is preferable that the control unit 14B causes the shaping liquid 28 to be ejected onto dots $30_n$ inside the dots $30_n$ aligned along the outline of the dot region Q.

Upon reception of the resume signal after the stop of the set of processes, the control unit 14B may cause the shaping liquid 28 to be ejected onto the dot region Q (that is, onto a region identical to the dot region Q) on the surface of the outermost powder layer $24_n$, the dot region Q being formed by the dots $30_n$ formed at the powder layer $24_n$.

Upon reception of the resume signal after the stop of the set of processes, the control unit 14B may cause any amount of the shaping liquid 28 to be ejected onto the surface of the outermost powder layer $24_n$ as long as a droplet (dot 32) of the shaping liquid 28 having the thickness T larger than zero and equal to or smaller than the thickness J is made to present on the surface of the powder layer $24_n$ at the time of the resuming of the operation, as described above.

Further, it is preferable that the control unit 14B adjusts the ejection amount of the shaping liquid 28 in accordance with the standby time between the reception of the stop signal and the reception of the resume signal such that the thickness T is achieved.

For example, the control unit 14B stores, in the storage unit 38, in advance the relation between the standby time and the amount of the shaping liquid 28 to be ejected to the outermost powder layer $24_n$ after the reception of the stop signal. This amount of the shaping liquid 28 corresponds to an amount ejected from a nozzle at one shot to the outermost powder layer $24_n$ after the reception of the stop signal.

The shaping device 12 measures in advance the standby time between the reception of a stop signal and the reception of a resume signal, and the amount of the shaping liquid 28 that can form the droplet having the thickness T in the three-dimensional shaping apparatus 10. The control unit 14B of the shaping device 12 may store the standby time and the ejection amount of the shaping liquid 28 in the storage unit 38 in association with each other in advance.

Figure 9A:
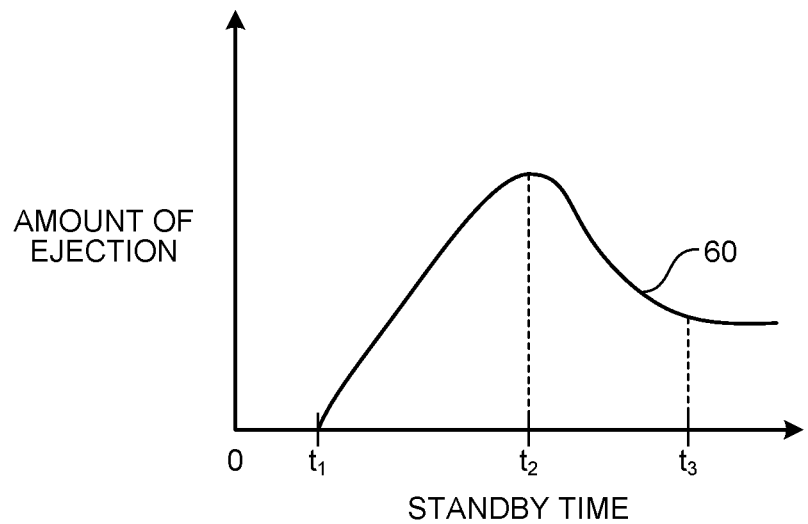
FIGS. 9A and 9B are a graph and a view illustrating an example of the relation between standby time and an ejection amount.
Figure 9B:
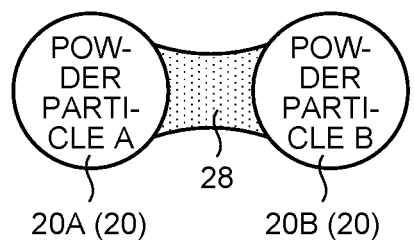

FIGS. 9A and 9B are a graph and a view illustrating an example of the relation between the standby time and the amount of the shaping liquid to be ejected. FIG. 9A illustrates a graph 60 illustrating an example of the relation between the standby time and the amount of the shaping liquid to be ejected. In FIG. 9A, $t_1$, $t_2$, and $t_3$ each represent a standby time t. The relation between $t_1$, $t_2$, and $t_3$ is represented by an inequality $0 < t_1 < t_2 < t_3$.

For example, the amount of the shaping liquid 28 necessary for achieving the thickness T increases with the standby time until the standby time reaches a certain time. However, when the standby time exceeds the certain time, the thickness T can be achieved with a smaller amount of the shaping liquid 28.

Specifically, as illustrated in FIG. 9A, when the standby time t is zero or more and less than $t_1$, the control unit 14B determines that the droplet (dot 32) of the shaping liquid 28 is still present on the surface of the powder layer 24. When the standby time is within this period ($0 \leq t < t_1$), the control unit 14B controls the supply unit 18 and the leveling unit 16 to supply the powder 20 onto the powder layer 24 without ejection of the shaping liquid 28.

When the standby time t is $t_1$ or more and less than $t_2$, the control unit 14B determines that the droplet (dot 32) of the shaping liquid 28 is not present on the surface of the powder layer 24. Specifically, the control unit 14B determines that the droplet (dot 32) of the shaping liquid 28 having the thickness T is not present on the surface of the powder layer 24 that is the outermost layer at the time of the stop of the operation.

The surface (powder surface) of the powder layer 24 becomes dry. Thus, the control unit 14B controls the ejection unit 26 to eject the shaping liquid 28 before the next powder layer 24 is formed. As the standby time t increases, the dry region (region in the thickness direction of the powder layer 24) increases. In this case, a larger amount of shaping liquid 28 needs to be ejected to form the droplet (dot 32) of the shaping liquid 28 having the thickness T on the dry region of the powder layer 24. Accordingly, the control unit 14B controls the ejection unit 26 to eject a larger amount of the shaping liquid 28 as the standby time t increases from $t_1$ to $t_2$.

However, once the standby time t exceeds $t_2$, the powder 20 starts reacting with the shaping liquid 28 and starts solidifying. FIG. 9B is a diagram illustrating a state in which the powder 20 starts reacting with the shaping liquid 28 and starts solidifying. As illustrated in FIG. 9B, the shaping liquid 28 forms a liquid bridge between particles of the powder 20 (between a powder particle 20A and a powder particle 20B). When solidification is achieved while a liquid bridge is formed, the surface of the powder 20 forms something like a wall. In other words, a wall of liquid bridges is formed near the surface of the powder layer 24.

Such a wall of liquid bridges formed near the surface of the powder layer 24 prevents the shaping liquid 28 from further permeating into the powder layer 24 even when a large amount of shaping liquid 28 is ejected onto the powder layer 24. In other words, when the standby time t exceeds $t_2$, the region of the wall of liquid bridges increases. Thus, a smaller amount of the shaping liquid 28 is ejected onto the surface of the powder layers 24 to form a droplet (dot 32) of the shaping liquid 28 having the thickness T as the standby time t proceeds from $t_2$ to $t_3$. Accordingly, the control unit 14B controls the ejection unit 26 to eject a smaller amount of shaping liquid 28 when the standby time t is $t_2$ or more and less than $t_3$.

When the standby time t is $t_3$ or more, the reaction between the powder 20 and the shaping liquid 28 is completed. Consequently, as indicated in FIG. 9A, a necessary amount of shaping liquid 28 to cause a droplet (dot 32) of the shaping liquid 28 having the thickness T to present on the surface of the powder layer 24 becomes approximately constant. The control unit 14B controls the ejection unit 26 to cause an ejection amount of the shaping liquid 28 to be approximately constant when the standby time t is $t_3$ or more.

The standby time $t_1$, $t_2$, and $t_3$ may be measured in advance. The control unit 14B of the shaping device 12 may store the standby time and the amount of the shaping liquid 28 to be ejected that is represented by the graph 60 in FIG. 9A, in the storage unit 38 in association with each other in advance. The control unit 14B may read the amount of the shaping liquid 28 to be ejected corresponding to the standby time t from the storage unit 38, and use the read amount as an amount of the shaping liquid 28 to be ejected onto the outermost powder layer 24 upon reception of a resume signal after the stop of the set of processes.

It is preferable that upon reception of the resume signal after the stop of the set of processes, the control unit 14B controls the ejection unit 26 to eject the shaping liquid 28 a plurality of times to the surface of the outermost powder layer 24.

Figure 10A:
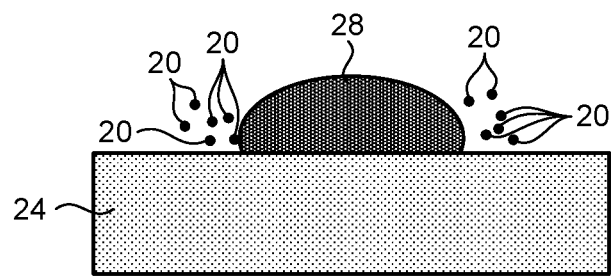
FIGS. 10A and 10B are schematic views illustrating an example of a state of the powder layer.
Figure 10B:
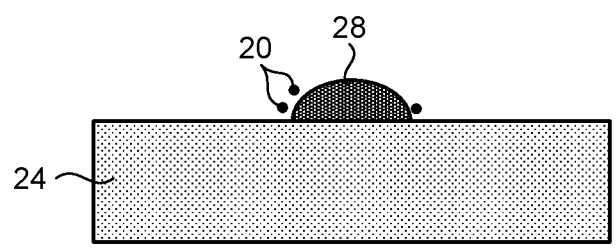

FIGS. 10A and 10B are schematic views illustrating an example of the state of the powder layer 24 when the shaping liquid 28 is ejected thereto. When the ejection unit 26 ejects the shaping liquid 28 to the surface of the powder layer 24 and the shaping liquid 28 lands thereon, some particles of the powder 20 on the powder layer 24 are blown up in some cases. As more amount of the shaping liquid 28 is ejected from the ejection unit 26 at one shot, more particles of the powder 20 are blown up.

That is, ejecting a large droplet of the shaping liquid 28 to the powder layer 24 blows up more particles of the powder 20 (see FIG. 10A) than the particles of the powder 20 blown up when a small droplet of the shaping liquid 28 is ejected to the powder layer 24 (see FIG. 10B).

Thus, it is preferable that the control unit 14B controls the ejection unit 26 to eject the shaping liquid 28 a plurality of times to the surface of the outermost powder layer 24 upon reception of the resume signal after the stop of the set of processes.

Figure 11:
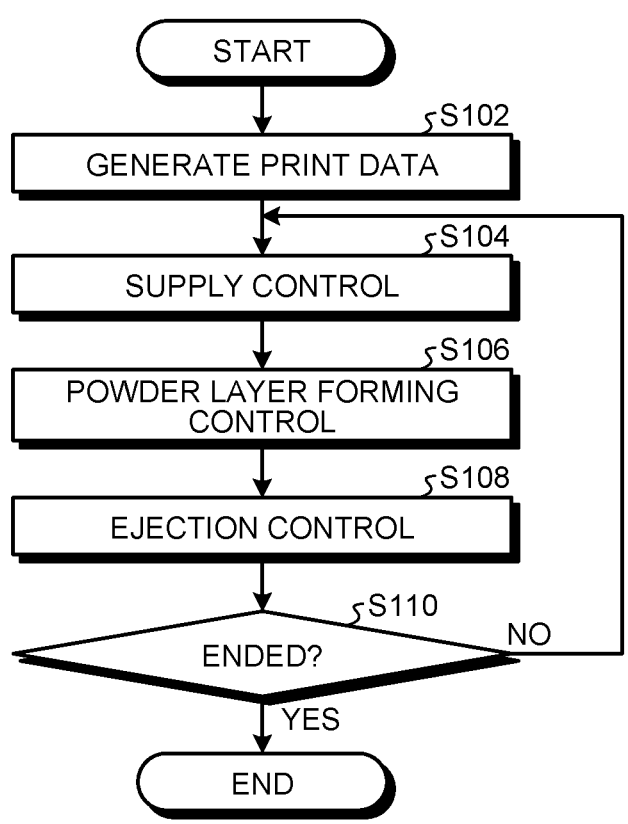
FIG. 11 is a flowchart illustrating an example of the procedure of shaping processing.

Described next is the procedure of the shaping processing executed by the information processing device 14 according to the present embodiment. FIG. 11 is a flowchart illustrating an example of the procedure of the shaping processing.

First, the control unit 14B generates print data with which the shaping device 12 can shape a three-dimensional shaped object, from image data representing a shaping target (Step S102). The control unit 14B then controls the shaping device 12 to shape the three-dimensional shaped object 31 corresponding to the shaping target using the print data.

Specifically, the control unit 14B controls the supply unit 18 to supply the powder 20 (Step S104). In the present embodiment, the control unit 14B controls the actuation of the leveling unit 16, the actuation of the support 18B of the supply unit 18, and the actuation of the support 22B to supply the powder 20. By the processing at Step S104, the powder 20 is supplied to the shaping unit 22.

The control unit 14B controls the leveling unit 16 to form a powder layer 24 (Step S106). In the present embodiment, the control unit 14B controls the leveling unit 16 to level the surface of the powder 20 supplied to the shaping unit 22 in the first direction X to form a powder layer 24 having the thickness J. By the processing at Step S106, the powder layer 24 is formed.

The control unit 14B controls the ejection unit 26 to eject the shaping liquid 28 (Step S108). In the present embodiment, the control unit 14B controls the ejection unit 26 to eject the shaping liquid 28 to positions on the surface of the powder layer 24 corresponding to the shaping target in accordance with the print data generated at Step S102 to form dots 30. By the processing at Step S108, the shaping liquid 28 is ejected to the powder layer 24 and the dots 30 are formed.

The control unit 14B determines whether to end the set of processes from Step S104 to Step S108 (Step S110). The control unit 14B determines, at Step S110, whether the set of processes has been repeated a certain number of times necessary for shaping the three-dimensional shaped object in accordance with the print data generated at Step S102.

If no at Step S110 (No at Step S110), the control unit 14B executes the processing at Step S104 again. If yes at Step S110 (Yes at Step S110), the control unit 14B ends this routine.

Figure 12:
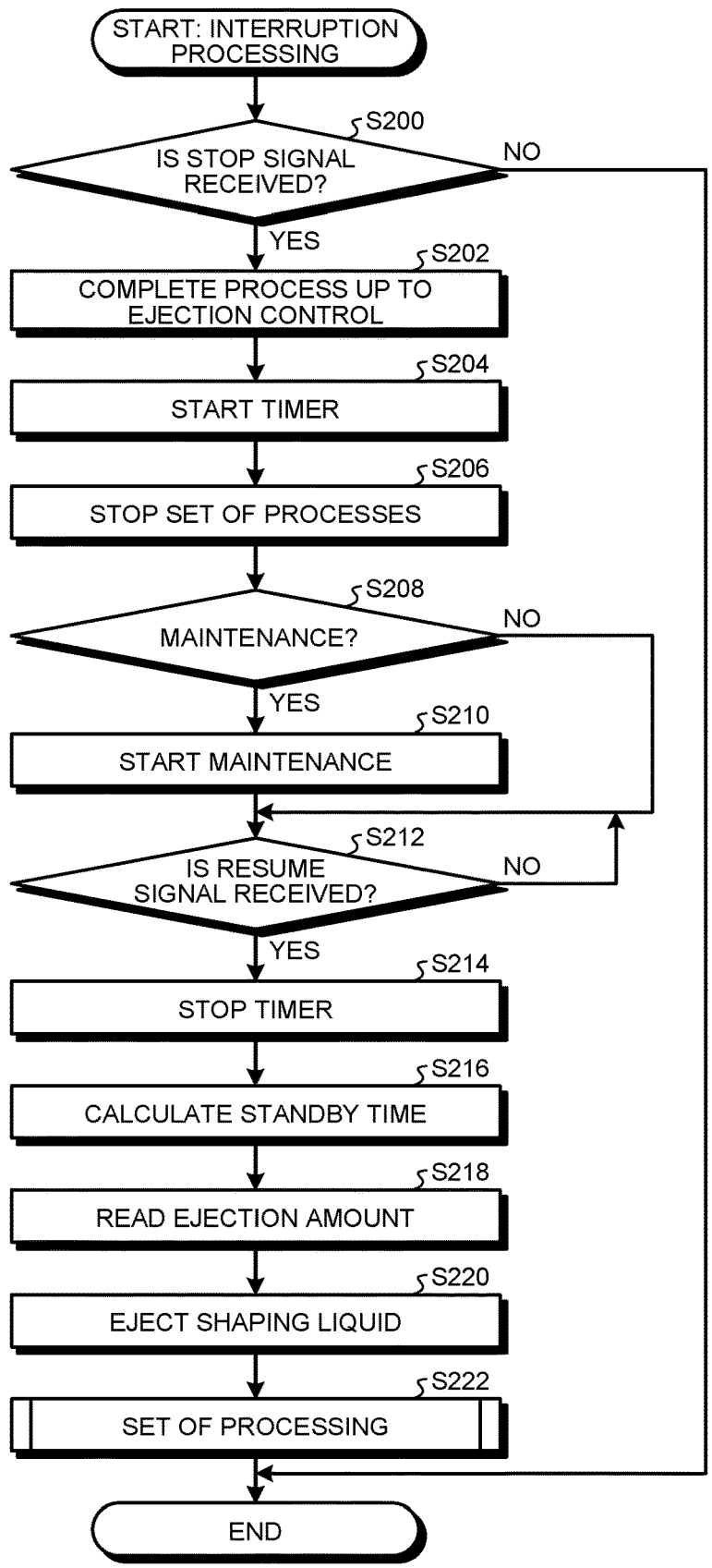
FIG. 12 is a flowchart illustrating an example of the procedure of interruption processing.

The information processing device 14 according to the present embodiment executes interruption processing illustrated in FIG. 12 in the middle of the procedure illustrated in FIG. 11. FIG. 12 is a flowchart illustrating an example of the procedure of the interruption processing.

First, the reception unit 14A determines whether a stop signal indicating a stop of operation has been received (Step S200). If no at Step S200 (No at Step S200), the control unit 14B ends this routine.

If yes at Step S200 (Yes at Step S200), the control unit 14B executes the processing at Step S202. At Step S202, the control unit 14B controls the shaping device 12 to complete processes up to the control of the ejection of the shaping liquid 28 by the ejection unit 26 in the current routine of the set of processes (Step S202).

The control unit 14B starts a timer to measure the standby time (Step S204). The standby time is, as described above, a time period from the reception of a stop signal to the reception of a resume signal. In this routine, for example, the standby time is a time period starting from the completion of the current set of processes after the reception of the stop signal and ending upon reception of the resume signal.

The control unit 14B controls the shaping device 12 to stop the set of processes (Step S206).

The control unit 14B determines whether the stop signal received at Step S200 is transmitted for the purpose of maintenance (Step S208). This determination at Step S208 is made such that the control unit 14B determines whether the stop signal is transmitted from the maintenance unit 29.

If yes at Step S208 (Yes at Step S208), the control unit 14B executes the processing at Step S210. The control unit 14B controls the maintenance unit 29 to start maintenance work on the ejection unit 26 (Step S210). By the processing at Step S210, the maintenance of the ejection unit 26 by the maintenance unit 29 is started. The control unit 14B then executes the processing at Step S212.

If no at Step S208 (No at Step S208), the control unit 14B executes the processing at Step S212.

At Step S212, the control unit 14B repeats negative determination (No at Step S212) until the reception unit 14A determines that a resume signal has been received (Yes at Step S212). If yes at Step S212 (Yes at Step S212), the control unit 14B executes the processing at Step S214.

At Step S214, the control unit 14B stops the timer started at Step S204 (Step S214). Then, the control unit 14B calculates the time period from the starting of the timer at Step S204 to the ending of the timer at Step S214 to calculate the standby time (Step S216).

The control unit 14B reads the amount of the shaping liquid 28 to be ejected corresponding to the standby time calculated at Step S216, from the storage unit 38 (Step S218). Then, the control unit 14B cause the shaping liquid 28, whose amount is read at Step S218, to be ejected onto at least a part of a dot region on the surface of the existing outermost powder layer 24, the dot region being formed by the dots 30 formed at existing outermost the powder layer 24 (Step S220).

The control unit 14B controls the shaping device 12 to resume the set of processes (Step S222). The processing at Step S222 is the processing executed at Steps S104 to S110 in FIG. 11. The control unit 14B then ends this routine.

As described above, the three-dimensional shaping apparatus 10 according to the present embodiment includes the supply unit 18, the leveling unit 16, the ejection unit 26, the control unit 14B, and the reception unit 14A. The supply unit 18 supplies the powder 20. The leveling unit 16 levels the surface of the supplied powder 20 in the first direction X to form a powder layer 24. The ejection unit 26 ejects the shaping liquid 28 to a position on the surface of the powder layer 24 corresponding to a shaping target to form a dot 30.

The control unit 14B controls the supply unit 18, the leveling unit 16, and the ejection unit 26 to repeat the set of processes of supplying the powder 20, forming the powder layer 24, and ejecting the shaping liquid 28 to shape a three-dimensional shaped object 31 corresponding to the shaping target. The reception unit 14A receives a stop signal indicating a stop of operation and a resume signal indicating resuming of the operation.

The control unit 14B stops the set of processes upon reception of the stop signal, and upon reception of the resume signal after the reception of the stop signal, the control unit 14B controls the supply unit 18, the leveling unit 16, and the ejection unit 26 to eject the shaping liquid 28 onto at least a part of a dot region Q on the surface of the outermost powder layer 24, the dot region being formed by the dot 30 formed at the powder layer 24, and then resume the set of processes.

In the three-dimensional shaping apparatus 10 according to the present embodiment, the shaping liquid 28 is ejected onto at least a part of the dot region Q formed by the dot 30 on the existing outermost powder layer 24 before resuming of the set of processes that is resumed upon reception of the resume signal.

With this configuration, the dot 30 formed at the powder layer 24 before the stop of the set of processes combines with a dot 30 formed by the shaping liquid 28 on a new powder layer 24 that is formed after resuming of the set of processes via the dot 32 formed by the shaping liquid 28 ejected after the stop and before the resuming of the set of processes, thereby forming contiguous dots (see FIG. 7).

Thus, the shaping device 12 according to the present embodiment can prevent strength loss in the resulting three-dimensional shaped object 31 even if the set of processes is stopped and then resumed in the middle of the shaping of the three-dimensional shaped object 31.

The shaping device 12 according to the present embodiment can prevent strength loss in the three-dimensional shaped object 31.

It is preferable that upon reception of the resume signal after the reception of the stop signal, the control unit 14B controls the supply unit 18, the leveling unit 16, and the ejection unit 26 to eject the shaping liquid 28 a plurality of times onto at least a part of the dot region Q on the surface of the outermost powder layer 24, the dot region being formed by the dot 30 formed at the powder layer 24, and then resume the set of processes.

It is preferable that upon reception of the resume signal after the reception of the stop signal, the control unit 14B controls the supply unit 18, the leveling unit 16, and the ejection unit 26 to eject an amount of the shaping liquid 28 onto at least a part of the dot region Q formed by the dot 30 formed at the powder layer 24, the amount of the shaping liquid 28 being such that a droplet of the shaping liquid 28 having a thickness larger than zero and equal to or smaller than the thickness J is made to present on the surface of the powder layer 24 at the time of the resuming of the operation, and then resume the set of processes.

It is preferable that upon reception of the resume signal after the reception of the stop signal, the control unit 14B controls the supply unit 18, the leveling unit 16, and the ejection unit 26 to eject an amount of the shaping liquid 28 onto at least a part of the dot region Q on the surface of the outermost powder layer 24, the dot region being formed by the dot 30 formed at the powder layer 24, the amount of the shaping liquid 28 depending on a standby time from the reception of the stop signal to the reception of the resume signal, and then resume the set of processes.

It is preferable that upon reception of the resume signal after the reception of the stop signal, the control unit 14B controls the supply unit 18, the leveling unit 16, and the ejection unit 26 to eject the shaping liquid 28 onto a region inside the outline of the dot region Q on the surface of the outermost powder layer 24, the dot region Q being formed by the dot 30 formed at the powder layer 24, and then resume the set of processes.

The three-dimensional shaping method according to the present embodiment is a method performed by the three-dimensional shaping apparatus 10 including the supply unit 18 that supplies the powder 20, the leveling unit 16 that levels the surface of the supplied powder 20 in the first direction X to form a powder layer 24, and the ejection unit 26 that ejects the shaping liquid 28 to a position corresponding to a shaping target on the surface of the powder layer 24 to form a dot 30. The three-dimensional shaping method according to the present embodiment includes controlling the supply unit 18, the leveling unit 16, and the ejection unit 26 to repeat a set of processes of supplying the powder 20, forming the powder layer 24, and ejecting the shaping liquid 28 to shape the three-dimensional shaped object 31 corresponding to the shaping target, and receiving a stop signal indicating a stop of operation and a resume signal indicating resuming of the operation. The controlling includes stopping the set of processes upon reception of the stop signal, and upon reception of the resume signal after the reception of the stop signal, controlling the supply unit 18, the leveling unit 16, and the ejection unit 26 to eject the shaping liquid 28 onto at least a part of a dot region Q on the surface of the outermost powder layer 24, the dot region Q being formed by the dot 30 formed at the powder layer 24, and then resume the set of processes.

The three-dimensional shaping computer program according to the present embodiment is a computer program that is executed by a computer that controls the shaping device 12 including the supply unit 18 that supplies the powder 20, the leveling unit 16 that levels the surface of the supplied powder 20 in the first direction X to form a powder layer 24, and the ejection unit 26 that ejects the shaping liquid 28 to a position corresponding to a shaping target on the surface of the powder layer 24 to form a dot 30. The three-dimensional shaping computer program according to the present embodiment includes controlling the supply unit 18, the leveling unit 16, and the ejection unit 26 to repeat a set of processes of supplying the powder 20, forming the powder layer 24, and ejecting the shaping liquid 28 to shape the three-dimensional shaped object 31 corresponding to the shaping target, and receiving a stop signal indicating a stop of operation and a resume signal indicating resuming of the operation. The controlling includes stopping the set of processes upon reception of the stop signal, and upon reception of the resume signal after the reception of the stop signal, controlling the supply unit 18, the leveling unit 16, and the ejection unit 26 to eject the shaping liquid 28 onto at least a part of a dot region Q on the surface of the outermost powder layer 24, the dot region being formed by the dot 30 formed at the powder layer 24, and then resume the set of processes.

The information processing device 14 according to the present embodiment controls the shaping device 12 including the supply unit 18 that supplies the powder 20, the leveling unit 16 that levels the surface of the supplied powder 20 in the first direction X to form a powder layer 24, and the ejection unit 26 that ejects the shaping liquid 28 to a position corresponding to a shaping target on the surface of the powder layer 24 to form a dot 30. The information processing device 14 includes the reception unit 14A and the control unit 14B.

The control unit 14B controls the supply unit 18, the leveling unit 16, and the ejection unit 26 to repeat a set of processes of supplying the powder 20, forming the powder layer 24, and ejecting the shaping liquid 28 to shape a three-dimensional shaped object 31 corresponding to the shaping target. The reception unit 14A receives a stop signal indicating a stop of operation and a resume signal indicating resuming of the operation.

Upon reception of the stop signal, the control unit 14B stops the set of processes, and upon reception of the resume signal after the reception of the stop signal, the control unit 14B controls the supply unit 18, the leveling unit 16, and the ejection unit 26 to eject the shaping liquid 28 onto at least a part of a dot region Q on the surface of the outermost powder layer 24, the dot region being formed by the dot 30 formed at the powder layer 24, and then resume the set of processes.

The following specifically describes the powder 20 and the shaping liquid 28 used in the present embodiment.

<Powder>

The powder 20 is made of a base material in a particulate form with the surface covered with a coating layer. The powder 20 may contain other components in addition to the base material.

Base Material

First, the base material is described. The base material is in a powdered or particulate form. The base material is made of, for example, metal, ceramic, carbon, polymer, wood, biocompatible material, or sand. To shape a stronger three-dimensional shaped object 31, it is preferable to use metal or ceramic that can be subjected to sintering processing.

Examples of the metal may include stainless steel (SUS), iron, copper, titanium, and silver. The stainless steel (SUS) is, for example, SUS316L. The ceramic is, for example, metal oxides. Specifically, the ceramic is, for example, silica ($SiO_2$), alumina ($Al_2O_3$), zirconia ($ZrO_2$), or titania ($TiO_2$). The carbon is, for example, graphite, graphene, carbon nanotube, carbon nanohorn, or fullerene.

The polymer is, for example, a known water-insoluble resin. The wood is, for example, wood chip or cellulose. The biocompatible material is, for example, polylactic acid or calcium phosphate.

The base material may contain one type of material of the aforementioned materials, or may contain a plurality of types of materials thereof.

The base material may be commercially available particles or powder made of the aforementioned materials. Examples of the commercially available particles or powder may include SUS316L (PSS316L manufactured by Sanyo Special Steel Co., Ltd.), $SiO_2$ (EXCELICA SE-15K manufactured by Tokuyama Corporation), $AlO_2$ (TAIMICRON TM-5D manufactured by Taimei Chemicals Co., Ltd.), and $ZrO_2$ (TZ-B53 manufactured by Tosoh Corporation).

The base material may be subjected to known surface (modification) processing to enhance affinity to the coating layer (to be described later) that covers the surface of the base material.

The mean particle size of the base material may be selected as appropriate depending on the purpose, and thus is not limited to any particular value. For example, the mean particle size of the base material is preferably 0.1 μm or more and 500 μm or less, more preferably 5 μm or more and 300 μm or less, and still more preferably 15 μm or more and 250 μm or less.

When the base material has a mean particle size of 0.1 μm or more and 500 μm or less, efficiency of fabrication of the three-dimensional shaped object 31 is increased and the base material is easy to manage or handle. When the base material has a mean particle size of 500 μm or less, the powder layer 24, which is formed by the powder 20, has a higher density and thus the resulting three-dimensional shaped object 31 can be less porous.

The mean particle size of the base material can be measured in accordance with a known method using a known particle size analyzer such as Microtrac HRA (manufactured by Nikkiso Co., Ltd.).

The particle size distribution of the base material may be selected as appropriate depending on the purpose, and thus is not limited to any particular value. The shape, surface area, circularity, fluidity, wettability, or other properties of the base material may be selected as appropriate depending on the purpose, and thus is not limited to any particular value.

Coating Layer

Described next is the coating layer that covers the surface of the base material. The coating layer has a function of dissolving in the shaping liquid 28 and then solidifying, and may be prepared depending on the types of the shaping liquid 28.

For example, the coating layer is preferably made of an organic material.

The organic material is preferably dissolvable in the shaping liquid 28 and cross-linkable by, for example, a cross-linking agent contained in the shaping liquid 28.

The phrase that the organic material is dissolvable in the shaping liquid 28 means, for example, when 1 g of organic material is mixed with 100 g of the shaping liquid 28 as a solvent at 30° C. and stirred, 90% by mass or more of the organic material dissolves in the solvent.

The viscosity of 4% by mass (w/w %) solution of the organic material used for the coating layer at 20° C. is preferably 40 mPa·s or less, more preferably 1 mPa·s or more and 35 mPa·s or less, and particularly preferably 5 mPa·s or more and 30 mPa·s or less.

When the aforementioned viscosity of the organic material used for the coating layer is 40 mPa·s or less, the strength and dimensional accuracy of the resulting three-dimensional shaped object 31, which includes the dots 30 formed by the shaping liquid 28 ejected onto the powder 20, increase. The viscosity may be measured, for example, in accordance with JIS K7117.

The organic material used for the coating layer is a material that has a function of dissolving in the shaping liquid 28 and then solidifying, and may be selected as appropriate depending on the purpose or the types of the shaping liquid 28. The organic material used for the coating layer is preferably a water-soluble material in terms of manageability or environmental loads. Examples of the water-soluble organic material may include water-soluble resins and water-soluble prepolymers.

When the powder 20 contains a water-soluble organic material in the coating layer, an aqueous medium can be used as the shaping liquid 28. When the coating layer is made of a water-soluble organic material, the powder 20 can be separated into the organic material and the base material by water treatment in disposing of or recycling the powder 20.

Examples of the water-soluble resins may include polyvinyl alcohol resin, polyacrylic resin, cellulosic resin, starch, gelatin, vinyl resin, amide resin, imide resin, acrylic resin, and polyethylene glycol.

These water-soluble resins may be homopolymers or heteropolymers (copolymers), or may be modified, as long as the water-soluble resins exhibit water-soluble properties. The water-soluble resins may incorporate a known functional group, or may be in the form of a salt.

When, for example, polyvinyl alcohol resin is used for the coating layer, the polyvinyl alcohol resin may be polyvinyl alcohol, modified polyvinyl alcohol that is modified with an acetoacetyl group, an acetyl group, or silicone (such as acetoacetyl-modified polyvinyl alcohol, acetyl-modified polyvinyl alcohol, or silicone-modified polyvinyl alcohol), or butanediol vinyl alcohol copolymer.

When polyacrylic resin is used for the coating layer, the polyacrylic resin may be polyacrylic acid or salts thereof such as sodium polyacrylate. When cellulosic resin is used for the coating layer, the cellulosic resin may be cellulose or carboxymethyl cellulose (CMC). When acrylic resin is used for the coating layer, the acrylic resin may be, for example, polyacrylic acid or acrylic acid/maleic anhydride copolymer.

When water-soluble prepolymer is used for the coating layer, the water-soluble prepolymer may be, for example, an adhesive water-soluble isocyanate prepolymer contained in, for example, water stopping agents.

Examples of organic materials or resins that are water-insoluble and that can be used for the coating layer may include acryl, maleic acid, silicone, butyral, polyester, polyvinyl acetate, vinyl chloride/vinyl acetate copolymers, polyethylene, polypropylene, polyacetal, ethylene/vinyl acetate copolymers, ethylene/(meth)acrylic acid copolymers, α-olefin/maleic anhydride based copolymers, esterified α-olefin/maleic anhydride based copolymers, polystyrene, poly(meth)acrylic ester, α-olefin/maleic anhydride/vinyl group containing monomer copolymers, styrene/maleic anhydride copolymers, styrene/(meth)acrylic ester copolymers, polyamide, epoxy resin, xylene resin, ketone resin, petroleum resin, rosin or derivatives thereof, coumarone-indene resin, terpene resin, polyurethane resin, synthetic rubbers such as styrene/butadiene rubber, polyvinyl butyral, nitrile rubber, acrylic rubber, and ethylene/propylene rubber, and nitrocellulose.

The coating layer is preferably made of an organic material having a cross-linkable functional group. The cross-linkable functional group may be selected as appropriate depending on the purpose, and thus is not limited to any particular type. Examples of the cross-linkable functional group may include a hydroxyl group, a carboxyl group, an amide group, a phosphate group, a thiol group, an acetoacetyl group, and an ether bond.

Using an organic material having a cross-linkable functional group for the coating layer is preferable in that the organic material can easily cross-link with each other to form a solid three-dimensional shaped object 31.

The organic material used for the coating layer is preferably a polyvinyl alcohol resin having a mean degree of polymerization of 400 or more and 1100 or less. Furthermore, the organic material used for the coating layer is preferably a modified polyvinyl alcohol resin containing a cross-linkable functional group in molecules thereof. In particular, the coating layer is preferably made of an acetoacetyl-modified polyvinyl alcohol resin.

When, for example, the coating layer is made of a polyvinyl alcohol resin having an acetoacetyl group, the acetoacetyl group can easily form a complex three-dimensional network structure (cross-linking structure) via metal contained in a cross-linking agent in the shaping liquid 28 (excellent in cross-linking reactivity). Thus, the resulting three-dimensional shaped object 31 has considerably high flexural strength.

The coating layer may contain one types of polyvinyl alcohol resin having an acetoacetyl group (acetoacetyl-modified polyvinyl alcohol resins), or two or more types thereof that exhibit different properties such as viscosity or saponification values. It is preferable to use an acetoacetyl-modified polyvinyl alcohol resin having a mean degree of polymerization of 400 or more and 1100 or less for the coating layer.

The coating layer may contain one types of the aforementioned organic materials or two or more types thereof, or may be made of an organic material made by synthesis as appropriate or a commercially available organic material.

Examples of the commercially available organic material used for the coating layer may include polyvinyl alcohol (PVA-205C, PVA-220C manufactured by Kuraray Co., Ltd.), polyacrylic acid (JURYMER AC-10 manufactured by Toagosei Co., Ltd.), sodium polyacrylate (JURYMER AC-103P manufactured by Toagosei Co., Ltd.), acetoacetyl-modified polyvinyl alcohol (GOHSENX Z-300, GOHSENX Z-100, GOHSENX Z-200, GOHSENX Z-205, GOHSENX Z-210, GOHSENX Z-220 manufactured by The Nippon Synthetic Chemical Industry Co., Ltd.), carboxyl-modified polyvinyl alcohol (GOHSENX T-330, GOHSENX T-350, GOHSENX T-330T manufactured by The Nippon Synthetic Chemical Industry Co., Ltd.), butanediol vinyl alcohol copolymer (Nichigo G-Polymer OKS-8041 manufactured by The Nippon Synthetic Chemical Industry Co., Ltd.), diacetone acrylamide-modified polyvinyl alcohol (DF-05 manufactured by Japan Vam & Poval Co., Ltd.), sodium carboxymethyl cellulose (Cellogen 5A, Cellogen 6A manufactured by DKS Co. Ltd.), starch (HISTARD PSS-5 manufactured by Sanwa Starch Co., Ltd.), and gelatin (beMatrix gelatin manufactured by Nitta Gelatin Inc.).

The thickness of the coating layer is not limited to any particular value, but, for example, the average thickness is preferably 5 nm or more and 1000 nm or less, more preferably, 5 nm or more and 500 nm or less, still more preferably 50 nm or more and 300 nm or less, and particularly preferably 100 nm or more and 200 nm or less.

When the average thickness of the coating layer is 5 nm or more, the strength of the three-dimensional shaped object 31 that includes the dots 30 formed by the shaping liquid 28 ejected onto the powder 20 increases. When the average thickness of the coating layer is 1000 nm or less, the dimensional accuracy of the three-dimensional shaped object 31 that includes the dots 30 formed by the shaping liquid 28 ejected onto the powder 20 increases.

The average thickness of the coating layer can be measured by, for example, embedding the powder 20 in an acrylic resin, performing etching or the like to expose a surface of the base material, and then using a scanning tunnel microscope (STM), an atomic force microscope (AFM), a scanning electron microscope (SEM), or the like.

When the coating layer is made of a material containing a cross-linking agent, the coating layer can be made thinner than a coating layer that does not contain a cross-linking agent. In other words, the hardening effect of the cross-linking agent can make the coating layer thinner, which can achieve both high strength and dimensional accuracy of the resulting three-dimensional shaped object 31.

The surface coverage (area ratio) of the base material with the coating layer may be adjusted as appropriate depending on the purpose, and thus is not limited to any particular value. For example, the surface coverage of the base material with the coating layer is preferably 15% or more, more preferably 50% or more, and particularly preferably 80% or more.

When the surface coverage is 15% or more, the strength of the three-dimensional shaped object 31 that includes the dots 30 formed by the shaping liquid 28 ejected onto the powder 20 increases. When the surface coverage is 15% or more, the dimensional accuracy of the three-dimensional shaped object 31 that includes the dots 30 formed by the shaping liquid 28 ejected onto the powder 20 increases.

The surface coverage of the base material with the coating layer is measured by, for example, observing a picture of the powder 20 taken by an electron microscope to obtain the ratio (%) of the area covered with the coating layer to the entire surface area of the base material with respect to each particle of the powder 20 in the picture, and calculating the average. The average may be used as the surface coverage.

Alternatively, the coverage may be measured by elemental mapping on the portion of the base material of the powder 20 covered with the coating layer using energy dispersive X-ray spectrometry such as SEM/EDS.

The powder 20 may contain other components. Such other components may be selected as appropriate depending on the purpose, and thus are not limited to any particular component. Examples of other components may include a fluidizer, a filler, a leveling agent, and a sintering aid.

When the powder 20 contains a fluidizer, the powder 20 can form the powder layer 24 easily and efficiently. When the powder 20 contains a filler, the resulting three-dimensional shaped object 31 can be less porous. When the powder 20 contains a leveling agent, the wettability of the powder 20 increases and thus handleability of the powder 20 increases. When the powder 20 contains a sintering aid, the resulting three-dimensional shaped object 31, when sintered, can be sintered at a lower temperature.

Method for Manufacturing Powder

The method for manufacturing the powder 20 may be selected as appropriate depending on the purpose, and thus is not limited to any particular method.

For example, the surface of the particles (powder) of the base material may be coated with a coating layer by a known coating method. Examples of the known coating method may include a rolling fluidized coating method, a spray drying method, a stirring mixing adding method, a dipping method, and a kneader coating method. These coating methods can be practiced by, for example, known commercially available coating machines or granulating machines.

Properties of Powder

The mean particle size of the powder 20 may be selected as appropriate depending on the purpose, and thus is not limited to any particular value. For example, the mean particle size of the powder 20 is preferably 3 µm or more and 250 µm or less, more preferably 3 µm or more and 200 µm or less, still more preferably 5 µm or more and 150 µm or less, and particularly preferably 10 µm or more and 85 µm or less.

When the mean particle size of the powder 20 is 3 µm or more, the powder 20 exhibits a higher fluidity and thus more easily forms the powder layer 24, and the surface of the powder layer 24 can be more smooth. This configuration can improve shaping efficiency of the three-dimensional shaped object 31 and also improve handleability and dimensional accuracy of the three-dimensional shaped object 31.

When the mean particle size of the powder 20 is 250 µm or less, the space among the particles of the powder 20 in the powder layer 24 can be reduced. This configuration can reduce the porosity of the three-dimensional shaped object 31, which can increase the strength of the three-dimensional shaped object 31. From the aforementioned viewpoints, the mean particle size of the powder 20 is preferably 3 µm or more and 250 µm or less to achieve both high dimensional accuracy and strength.

The particle size distribution of the powder 20 may be selected as appropriate depending on the purpose, and thus is not limited to any particular value.

The angle of repose of the powder 20 is preferably 60 degrees or smaller, more preferably 50 degrees or smaller, and still more preferably 40 degrees or smaller. When the angle of repose of the powder 20 is 60 degrees or smaller, particles of the powder 20 can be disposed efficiently and stably on desired positions. The angle of repose can be measured with, for example, a powder characteristics tester (Powder Tester PT-N manufactured by Hosokawa Micron Corporation).

Shaping Liquid

Described next is the shaping liquid 28 used in the present embodiment. The shaping liquid 28 can be any type of liquid that dissolves the coating layer of the powder 20 and then solidifies the coating layer.

The shaping liquid 28 can be prepared as appropriate depending on the material of the coating layer of the powder 20 used for the shaping. For example, the shaping liquid 28 contains a solvent that dissolves the coating layer of the powder 20.

The solvent included in the shaping liquid 28 can be any type of solvent that can dissolve the coating layer of the powder 20, and thus is not limited to any particular solvent. Examples of the solvent may include water, alcohols such as ethanol, ethers, ketones, and other hydrophilic solvents, aliphatic hydrocarbons, ether-based solvents such as glycol ethers, ester-based solvents such as ethyl acetate, ketone-based solvents such as methyl ethyl ketone, and higher alcohols.

Among these solvents, a hydrophilic solvent is preferable and water is more preferable in terms of environmental loads and discharging stability of the shaping liquid 28. The hydrophilic solvent may be a mixed solvent that contains water and other components such as alcohols. When the shaping liquid 28 contains a hydrophilic solvent, it is preferable that the coating layer of the powder 20 is mainly made of a water-soluble organic material.

The hydrophilic solvent used for the shaping liquid 28 is, for example, water, alcohols such as ethanol, ethers, or ketones. The hydrophilic solvent may be an organic solvent that contains other components than water, such as alcohols.

It is preferable that the shaping liquid 28 contains a cross-linking agent that cross-links the material constituting the coating layer of the powder 20. The shaping liquid 28 may contain a solvent that dissolves the coating layer of the powder 20, components that promote the dissolution in the solvent, and stabilizers that keep the preservation stability of the shaping liquid 28. The shaping liquid 28 may contain still other components as necessary.

When the shaping liquid 28 contains a cross-linking agent, the shaping liquid 28 ejected onto the powder 20 dissolves the coating layer of the powder 20 (or resins contained in the coating layer, for example) and cross-links the coating layer with the cross-linking agent contained in the shaping liquid 28. Thereby, the coating layers of the particles of the powder 20 are combined with each other and thus the region on the powder 20 to which the shaping liquid 28 is ejected solidifies.

The cross-linking agent contained in the shaping liquid 28 is not limited to any particular agent, and can be any type of agent that can cross-link resins such as the organic material contained in the coating layer of the powder 20. The cross-linking agent may be selected as appropriate depending on the purpose. Examples of the cross-linking agent may include metal salts, metal complexes, organozirconium compounds, organotitanium compounds, and chelating agents.

Examples of the organozirconium compounds may include zirconium oxychloride, zirconium ammonium carbonate, and zirconium ammonium lactate.

Examples of the organotitanium compounds may include titanium acylate and titanium alkoxide.

The metal salts are, for example, metal salts that ionize a divalent or higher cationic metal in water. Specifically, metal salts may be zirconium oxychloride octahydrate (tetravalent), aluminum hydroxide (trivalent), magnesium hydroxide (divalent), ammonium salt of titanium lactate (tetravalent), basic aluminum acetate (trivalent), ammonium salt of zirconium carbonate (tetravalent), or triethanolamine titanate (tetravalent).

The metal salts may be commercially available products. Examples of the commercially available products may include zirconium oxychloride octahydrate (zirconium oxychloride manufactured by Daiichi Kigenso Kagaku Kogyo Co., Ltd.), aluminum hydroxide (manufactured by Wako Pure Chemical Industries, Ltd.), magnesium hydroxide (manufactured by Wako Pure Chemical Industries, Ltd.), ammonium salt of titanium lactate (ORGATIX TC-300 manufactured by Matsumoto Fine Chemical Co., Ltd.), ammonium salt of zirconium lactate (ORGATIX ZC-300 manufactured by Matsumoto Fine Chemical Co., Ltd.), basic aluminum acetate (manufactured by Wako Pure Chemical Industries, Ltd.), bis-vinyl sulfone compounds (VSB(K-FJC) manufactured by FUJIFILM Finechemicals Co., Ltd.), ammonium salt of zirconium carbonate (Zircosol AC-20 manufactured by Daiichi Kigenso Kagaku Kogyo Co., Ltd.), triethanolamine titanate (ORGATIX TC-400 manufactured by Matsumoto Fine Chemical Co., Ltd.).

Among these commercially available products, ammonium salt of zirconium carbonate is preferred in terms of high strength of the resulting three-dimensional shaped object 31.

The shaping liquid 28 may contain one type of cross-linking agent or a plurality of types of cross-linking agents. Among the aforementioned compounds, metal salts are preferred for the use of the cross-linking agent contained in the shaping liquid 28.

It is preferable that the shaping liquid 28 contains a surfactant. Using a surfactant can adjust the surface tension of the shaping liquid 28.

The surfactant is, for example, an anionic surfactant or a nonionic surfactant, or an amphoteric surfactant. It is preferable to select a surfactant that will not impair the dispersion stability with a combination of wetting agent and water-soluble organic solvent.

The viscosity of the shaping liquid 28 is not limited to any particular value, but, for example, the viscosity of the shaping liquid 28 at 25° C. is preferably 25 mPa·s or less, and more preferably 3 mPa·s or more and 20 mPa·s or less. When the viscosity of the shaping liquid 28 at 25° C. is 25 mPa·s or less, the ejection unit 26 can stably eject the shaping liquid 28, which is preferable.

It is preferable that the viscosity change in the shaping liquid 28 after standing for three days at 50° C. is less than 20%. When the viscosity change in the shaping liquid 28 is 20% or more, the ejection unit 26 will unstably eject the shaping liquid 28 in some cases.

Described next is a hardware configuration of the information processing device 14 according to the present embodiment.

Figure 13:
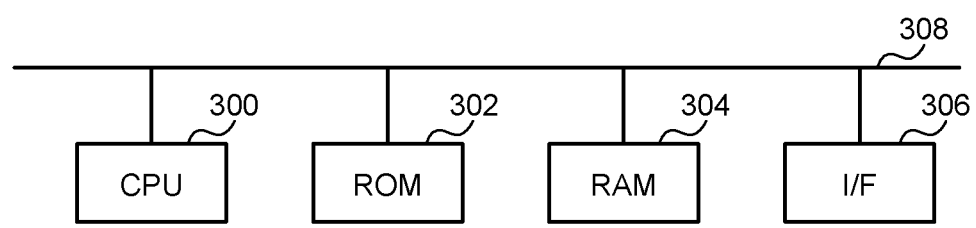
FIG. 13 is a diagram illustrating a hardware configuration of an information processing device.

FIG. 13 is a diagram illustrating a hardware configuration of the information processing device 14. The information processing device 14 includes a CPU 300, a read only memory (ROM) 302, a random access memory (RAM) 304, and an interface (I/F) 306. The CPU 300, the ROM 302, the RAM 304, and the I/F 306 are connected with each other via a bus 308, and constitute a hardware configuration using a typical computer.

The computer program for implementing the shaping processing executed by the information processing device 14 according to the embodiment above may be embedded and provided in the ROM 302.

The computer program for implementing the shaping processing executed by the information processing device 14 according to the embodiment above may be recorded and provided in a computer-readable recording medium such as a compact disc read only memory (CD-ROM), a flexible disk (FD), a compact disc recordable (CD-R), and a digital versatile disc (DVD), as an installable or executable file.

The computer program for implementing the shaping processing executed by the information processing device 14 according to the embodiment above may be stored in a computer connected to a network such as the Internet and downloaded via the network to provide the computer program. Furthermore, the computer program for implementing the shaping processing executed by the information processing device 14 according to the embodiment above may be provided or distributed via a network such as the Internet.

The computer program for implementing the shaping processing executed by the information processing device 14 according to the embodiment above has a module configuration including the units described above. As actual hardware, the units described above are loaded on the main memory when the CPU 300 reads out and executes the program from the ROM 302 or other storage media, and the units are generated on the main memory.

An embodiment provides an advantageous effect that strength loss in a three-dimensional shaped object can be reduced.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A three-dimensional shaping apparatus comprising:
a supply unit configured to supply a powder to form supplied powder;
a leveling unit configured to level a surface of the supplied powder in a first direction to form a powder layer;
an ejection unit configured to eject a shaping liquid to at least one position on a surface of the powder layer, the at least one position corresponding to a shaping target, to form at least one dot;
a controller configured to,
control the supply unit, the leveling unit, and the ejection unit to repeat a set of processes of sequentially (a) supplying the powder, (b) forming the powder layer, and (c) ejecting the shaping liquid to shape a three-dimensional shaped object corresponding to the shaping target,
receive a stop signal indicating a stop an operation of the set of processes,
stop the set of processes in response to reception of the stop signal such that a last iteration of the set of processes formed an outermost powder layer,
receive a resume signal indicating a resumption of the operation, and
in response to reception of the resume signal after the reception of the stop signal, control the supply unit, the leveling unit, and the ejection unit such that prior to resumption of the set of processes, the set of processes are performed out of order by ejecting the shaping liquid onto a part of a dot region on a surface of the outermost powder layer prior to forming a next powder layer on the outermost powder layer, the dot region being formed by at least one dot formed at the outermost powder layer, and then resuming the set of processes, the part of the dot region being less than a entirety of the dot region.

2. The three-dimensional shaping apparatus according to claim 1, wherein in response to the reception of the resume signal after the reception of the stop signal, the controller is configured to control the supply unit, the leveling unit, and the ejection unit to eject the shaping liquid a plurality of times onto the part of the dot region on the surface of the outermost powder layer, the dot region being formed by the at least one dot formed at the outermost powder layer, and then resume the set of processes.

3. The three-dimensional shaping apparatus according to claim 1, wherein in response to controller is configured to control the supply unit, the leveling unit, and the ejection unit to eject an amount of the shaping liquid onto the part of the dot region formed by the at least one dot formed at the outermost powder layer, the amount of the shaping liquid being such that a droplet of the shaping liquid having a thickness larger than zero and equal to or smaller than a thickness of the powder layer is made to present on the surface of the outermost powder layer when the operation is resumed, and then resume the set of processes.

4. The three-dimensional shaping apparatus according to claim 1, wherein in response to the reception of the resume signal after the reception of the stop signal, the controller is configured to control the supply unit, the leveling unit, and the ejection unit to eject an amount of the shaping liquid onto the part of the dot region on the surface of the outermost powder layer, the dot region being formed by the at least one dot formed at the outermost powder layer, the amount of the shaping liquid depending on a standby time from the reception of the stop signal to the reception of the resume signal, and then resume the set of processes.

5. The three-dimensional shaping apparatus according to claim 1, wherein in response to the reception of the resume signal after the reception of the stop signal, the controller is configured to control the supply unit, the leveling unit, and the ejection unit to eject the shaping liquid onto a region inside an outline of the dot region on the surface of the outermost powder layer, the dot region being formed by the at least one dot formed at the outermost powder layer, and then resume the set of processes.

6. The three-dimensional shaping apparatus according to claim 1, wherein the controller is configured to,
create a first dot by performing a first iteration of the set of processes such that the first iteration includes supplying a first portion of the powder, forming a first powder layer and ejecting a first portion of the shaping liquid, stop the set of processes after the first iteration such that the first powder layer is the outermost powder layer, and create a second dot by performing a second iteration of the set of processes to create the second dot after resuming the set of processes such that the second iteration includes ejecting a second portion of the shaping liquid onto the part of the dot region on the surface of the outermost powder layer prior to forming a second powder layer.

7. The three-dimensional shaping apparatus according to claim 1, wherein the controller is configured to, control the supply unit, the leveling unit, and the ejection unit such that an amount of the shaping liquid ejected onto the part of the dot region on the surface of the outermost powder layer is based on a length of a standby time from the reception of the stop signal to the reception of the resume signal.

8. A three-dimensional shaping method performed by a three-dimensional shaping apparatus including a supply unit configured to supply a powder to form supplied powder, a leveling unit configured to level a surface of the supplied powder in a first direction to form a powder layer, and an ejection unit configured to eject a shaping liquid to at least one position on a surface of the powder layer, the at least one position corresponding to a shaping target, to form at least one dot, the three-dimensional shaping method comprising:

controlling, via a controller, the supply unit, the leveling unit, and the ejection unit to repeat a set of processes of sequentially (a) supplying the powder, (b) forming the powder layer, and (c) ejecting the shaping liquid to shape a three-dimensional shaped object corresponding to the shaping target; and receiving a stop signal indicating a stop an operation of the set of processes stopping, via the controller, the set of processes in response to reception of the stop signal such that a last iteration of the set of processes formed an outermost powder layer, receiving a resume signal indicating a resumption of the operation, and controlling, in response to reception of the resume signal after the reception of the stop signal, the supply unit, the leveling unit, and the ejection unit such that prior to resumption of the set of processes, the set of processes are performed out of order by ejecting the shaping liquid onto a part of a dot region on a surface of the outermost powder layer prior to forming a next powder layer on the outermost powder layer, the dot region being formed by at least one dot formed at the outermost powder layer, and then resuming the set of processes, the part of the dot region being less than a entirety of the dot region.

9. The three-dimensional shaping method according to claim 8, further comprising:

creating a first dot by performing a first iteration of the set of processes such that the first iteration includes supplying a first portion of the powder, forming a first powder layer and ejecting a first portion of the shaping liquid, stopping the set of processes after the first iteration such that the first powder layer is the outermost powder layer, and creating a second dot by performing a second iteration of the set of processes to create the second dot after resuming the set of processes such that the second iteration includes ejecting a second portion of the shaping liquid onto the part of the dot region on the surface of the outermost powder layer prior to forming a second powder layer.

10. The three-dimensional shaping method according to claim 8, further comprising:

controlling the supply unit, the leveling unit, and the ejection unit such that an amount of the shaping liquid ejected onto the part of the dot region on the surface of the outermost powder layer is based on a length of a standby time from the reception of the stop signal to the reception of the resume signal.

11. An information processing device configured to control a shaping device including a supply unit configured to supply a powder to form supplied powder, a leveling unit configured to level a surface of the supplied powder in a first direction to form a powder layer, and an ejection unit configured to eject a shaping liquid to at least one position on a surface of the powder layer, the at least one position corresponding to a shaping target, to form at least one dot, the information processing device comprising:

a controller configured to, control the supply unit, the leveling unit, and the ejection unit to repeat a set of processes of sequentially (a) supplying the powder, (b) forming the powder layer, and (c) ejecting the shaping liquid to shape a three-dimensional shaped object corresponding to the shaping target, receive a stop signal indicating a stop an operation of the set of processes, to stop the set of processes in response to reception of the stop signal such that a last iteration of the set of processes formed an outermost powder layer, receive a resume signal indicating a resumption of the operation, and in response to reception of the resume signal after the reception of the stop signal, control the supply unit, the leveling unit, and the ejection unit such that prior to resumption of the set of processes, the set of processes are performed out of order by ejecting the shaping liquid onto a part of a dot region on a surface of the outermost powder layer prior to forming a next powder layer on the outermost powder layer, the dot region being formed by at least one dot formed at the outermost powder layer, and then resuming the set of processes, the part of the dot region being less than a entirety of the dot region.

12. The information processing device according to claim 11, wherein the controller is configured to, create a first dot by performing a first iteration of the set of processes such that the first iteration includes supplying a first portion of the powder, forming a first powder layer and ejecting a first portion of the shaping liquid, stop the set of processes after the first iteration such that the first powder layer is the outermost powder layer, and create a second dot by performing a second iteration of the set of processes to create the second dot after resuming the set of processes such that the second iteration includes ejecting a second portion of the shaping liquid onto the part of the dot region on the surface of the outermost powder layer prior to forming a second powder layer.

13. The information processing device according to claim 11, wherein the controller is configured to, control the supply unit, the leveling unit, and the ejection unit such that an amount of the shaping liquid ejected onto the part of the dot region on the surface of the outermost powder layer is based on a length of a standby time from the reception of the stop signal to the reception of the resume signal.

\* \* \* \* \*